United States Patent
Mizuguchi

(10) Patent No.: US 9,154,292 B2
(45) Date of Patent: Oct. 6, 2015

(54) COMMUNICATION APPARATUS, COMMUNICATION SYSTEM, AND TIME SYNCHRONIZATION METHOD

(71) Applicant: Jun Mizuguchi, Tokyo (JP)

(72) Inventor: Jun Mizuguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/419,428

(22) PCT Filed: Nov. 28, 2012

(86) PCT No.: PCT/JP2012/080759
§ 371 (c)(1),
(2) Date: Feb. 3, 2015

(87) PCT Pub. No.: WO2014/083640
PCT Pub. Date: Jun. 5, 2014

(65) Prior Publication Data
US 2015/0188691 A1  Jul. 2, 2015

(51) Int. Cl.
*H04L 7/00* (2006.01)
*H04B 7/185* (2006.01)

(52) U.S. Cl.
CPC .......... *H04L 7/0012* (2013.01); *H04B 7/18513* (2013.01)

(58) Field of Classification Search
CPC ... H04L 7/0337; H04L 7/0334; H04L 7/0391; H04L 27/2647; H04L 25/03038; H04L 1/0618; H04L 1/06; H04L 1/0003; H04L 1/0071; H04B 1/30; H04B 1/1036
See application file for complete search history.

(56) References Cited

U.S. PATENT DOCUMENTS

| 6,807,194 | B1 | 10/2004 | Muto | |
|---|---|---|---|---|
| 2005/0041683 | A1* | 2/2005 | Kizer | 370/463 |

(Continued)

FOREIGN PATENT DOCUMENTS

| JP | 11 234237 | 8/1999 |
|---|---|---|
| JP | 2007 214670 | 8/2007 |

(Continued)

OTHER PUBLICATIONS

ITU-T G.8264N.1364 "Distribution of timing information through packet networks" International Telecommunication Union, (Oct. 2008), 36 pages.
ITU-T G.8265.1/Y.1365.1 "Precision time protocol telecom profile for frequency synchronization" International Telecommunication Union, (Oct. 2010), 29 pages.

(Continued)

*Primary Examiner* — Ted Wang
(74) *Attorney, Agent, or Firm* — Oblon, McClelland, Maier & Neustadt, L.L.P.

(57) ABSTRACT

A communication apparatus (a slave) that performs time synchronization with a master apparatus on the basis of a time synchronization message transmitted from the master apparatus (a master) at a fixed cycle. The communication apparatus (the slave) includes a CPU that stores, in a transmission request message for requesting transmission of the time synchronization message, a requesting transmission rate, and transmits the transmission request message to the communication apparatus (the master). The CPU calculates time synchronization accuracy, which is a difference between time of the master apparatus and time of its own apparatus, on the basis of the time synchronization message; determines on the basis of the time synchronization accuracy whether the requesting transmission rate is changed; and, transmits, if it is determined that the requesting transmission rate is changed, the transmission request message, in which the changed requesting transmission rate is stored, to the communication apparatus (the master).

9 Claims, 14 Drawing Sheets

(56) References Cited

U.S. PATENT DOCUMENTS

| | | | |
|---|---|---|---|
| 2007/0002987 A1* | 1/2007 | Sinha et al. | 375/354 |
| 2009/0067850 A1 | 3/2009 | Mizutani et al. | |
| 2009/0162065 A1* | 6/2009 | Mizutani et al. | 398/66 |
| 2012/0057865 A1* | 3/2012 | Hasegawa et al. | 398/16 |
| 2013/0077633 A1 | 3/2013 | Mizutani et al. | |
| 2013/0336341 A1 | 12/2013 | Kamada | |

FOREIGN PATENT DOCUMENTS

| | | |
|---|---|---|
| JP | 2009 52968 | 3/2009 |
| JP | 2009 65443 | 3/2009 |
| JP | 2009 290606 | 12/2009 |
| JP | 2010 206327 | 9/2010 |
| JP | 2011 9984 | 1/2011 |
| JP | 2011 40870 | 2/2011 |
| JP | 4872518 | 2/2012 |
| JP | 2012 60217 | 3/2012 |
| JP | 2012-222524 | 11/2012 |
| WO | 2009 118878 | 10/2009 |
| WO | 2012 118178 | 9/2012 |

OTHER PUBLICATIONS

ITU-T G.8265.1/Y.1365.1, "Precision time protocol telecom profile for frequency synchronization", International Telecommunication Union, (Jul. 2014), 30 pages.

IEEE Std. C37.238-2011, "IEEE Standard Profile for Use of IEEE 1588 Precision Time Protocol in Power System Applications", IEEE, (Jul. 14, 2011), 64 pages.

IEEE Std. 1588-2008, "IEEE Standard for a Precision Clock Synchronization Protocol for Networked Measurement and Control Systems", IEEE, (Jul. 24, 2008), 287 pages.

Mills, D., et al., IETF Request for Comments 5905, "Network Time Protocol Version 4: Protocol and Algorithms Specification", Internet Engineering Task Force, (Jun. 2010), 105 pages.

ITU-T Rec. G8264/Y.1364, "Distribution of timing information through packet networks", International Telecommunication Union, (May 2014), 40 pages.

International Search Report Issued Jan. 29, 2013 in PCT/JP12/080759 Filed Nov. 28, 2012.

Office Action issued Aug. 4, 2015 in Japanese Patent Application No. 2014-549690 (with English translation).

* cited by examiner

COMMUNICATION APPARATUS, COMMUNICATION SYSTEM, AND TIME SYNCHRONIZATION METHOD

FIELD

The present invention relates to a communication apparatus, a communication system, and a time synchronization method.

BACKGROUND

The synchronization technology has been widely used by carrying out clock synchronization, time synchronization or both on all apparatuses included in a system or on only necessary portions of the apparatuses by using wired and wireless lines in all industrial fields irrespective of the accuracy of synchronization, along with the recent digitization of information, automation and association among a variety of apparatuses, and refinement.

For example, the technology is used for synchronization between portable base stations connected to a mobile backhaul entrance line (a transmission line) and for detecting a location of failure in an electrical distribution network. With this synchronization technology, a GPS (Global Positioning System) is used mainly as a reference clock source and a reference time source. A synchronization technique that uses the GPS is stable and useful irrespective of the synchronization system being provided on the land, in the sky, and on the ocean when a reception antenna is open to the sky. However, due to some factors including the setting position of the reception antenna (e.g., not being open to the sky), weather, and solar flare, the reception antenna is impeded from receiving the signal sent from the GPS satellite, so the synchronization accuracy needed for the system is not satisfied.

Consequently, in the telecom field, the authentication and security field, and the electrical distribution network field, as a synchronization technique via a communication line for replacing the synchronization technique that uses the GPS, ITU-T (International Telecommunication Union Telecommunication Standardization Sector) G.8264 and the like are specified for clock synchronization; and NTP (Network Time Protocol) is specified in RFC (Request For Comments) in time synchronization (see Non Patent Literatures 1 and 2). Further, studies by standardization organizations (ITU-T, IEEE, etc.) on clock and time synchronization are proceeding with IEEE1588, IEEE C37.238-2011, ITU-T G.8265.1, and the like (see Non Patent Literatures 3 to 5).

CITATION LIST

Non Patent Literature

Non Patent Literature 1: ITU-T Rec. G.8264/Y.1364, "Distribution of timing information through packet networks," 2008
Non Patent Literature 2: IETF RFC 5905, "Network Time Protocol Version 4: Protocol and Algorithms Specification," 2010
Non Patent Literature 3: IEEE Std. 1588-2008, "IEEE Standard for a Precision Clock Synchronization Protocol for Networked Measurement and Control Systems," 2008
Non Patent Literature 4: IEEE Std. C37.238-2011, "IEEE Standard Profile for Use of IEEE1588 Precision Time Protocol in Power System Applications," 2011
Non Patent Literature 5: ITU-T Rec. G.8265.1/Y.1365.1, "Precision time protocol telecom profile for frequency synchronization," 2010

SUMMARY

Technical Problem

With the conventional clock synchronization, a master apparatus transmits an electrical signal or an optical signal to a slave apparatus via a communication line; the slave apparatus extracts a symbol from the received signal and performs clock extraction to obtain its own clock so as to realize clock synchronization between the master apparatus and the slave apparatus. Further, with the conventional time synchronization, the master apparatus exchanges a synchronization frame that is specified for the purpose of time synchronization (protocol processing) with the slave apparatus so as to perform transmission and reception of the synchronization frame between the master apparatus and the slave apparatus; the time information is notified from the master apparatus; a transmission delay between the master apparatus and slave apparatus is monitored if needed; and the delay of the transmission is corrected on the basis of the time information notified from the master apparatus to the slave apparatus, so that the time synchronization is thus realized.

When a transmission interval of the time synchronization frame is set to a fixed value in the time synchronization, there is a case in which although the slave apparatus determines the synchronization accuracy is being satisfied, the time synchronization frame is further transmitted from the master apparatus more than necessary. This gives the master apparatus a transmission load; the slave apparatus a reception load; and the communication line connecting between the master apparatus and the slave apparatus a transmission band stress. A reduction in these loads leads to security enhancement due to a reduction in power consumption, a reduction in a line load, and the suppression of the needless frame transmission and reception. However, if the transmission interval of the time synchronization frame is set to the fixed value, it is difficult to, for example, flexibly address reducing the loads in accordance with the time synchronization accuracy.

In a configuration in which the master apparatus that functions as a clock source is capable of supplying a clock which synchronizes with time (synchronizes with a pitch of time) to the slave apparatus, for an extreme example, which synchronizes with the clock described above, even if time information is given to the slave apparatus only once, the slave apparatus can maintain time synchronizing with the time source by counting time on the basis of the clock from the master apparatus, even without the time information being supplied periodically.

The present invention has been made in view of the above and it is an objective to provide a communication apparatus, a communication system, and a time synchronization method that can reduce transmission and reception loads.

Solution to Problem

To solve the problems described above and achieve the objectives, the present invention relates to a communication apparatus operating as a slave apparatus that performs time synchronization with a master apparatus on the basis of a time synchronization message transmitted from the master apparatus at a fixed cycle, the communication apparatus comprising a control unit that stores, in a transmission request message for requesting transmission of the time synchronization message, a requesting transmission rate, which is a requesting value of a transmission rate of the time synchronization message, and transmits the transmission request message to the master apparatus. The control unit calculates time synchronization accuracy, which is a difference between time of the master apparatus and time of its own apparatus, on the basis of the time synchronization message, determines, on the basis of the time synchronization accuracy, whether the requesting transmission rate is changed, and, transmits, if it is determined that the requesting transmission rate is changed, the transmission request message, in which the changed requesting transmission rate is stored, to the master apparatus.

Advantageous Effects of Invention

The communication apparatus, the communication system, and the time synchronization method according to the present invention attain an effect whereby it is possible to reduce transmission and reception loads.

DESCRIPTION OF EMBODIMENT

An embodiment of a communication apparatus, a communication system, and a time synchronization method according to the present invention is described in detail with reference to the drawings below. Note that the present invention is not limited to the embodiment.

Embodiment

Figure 1:
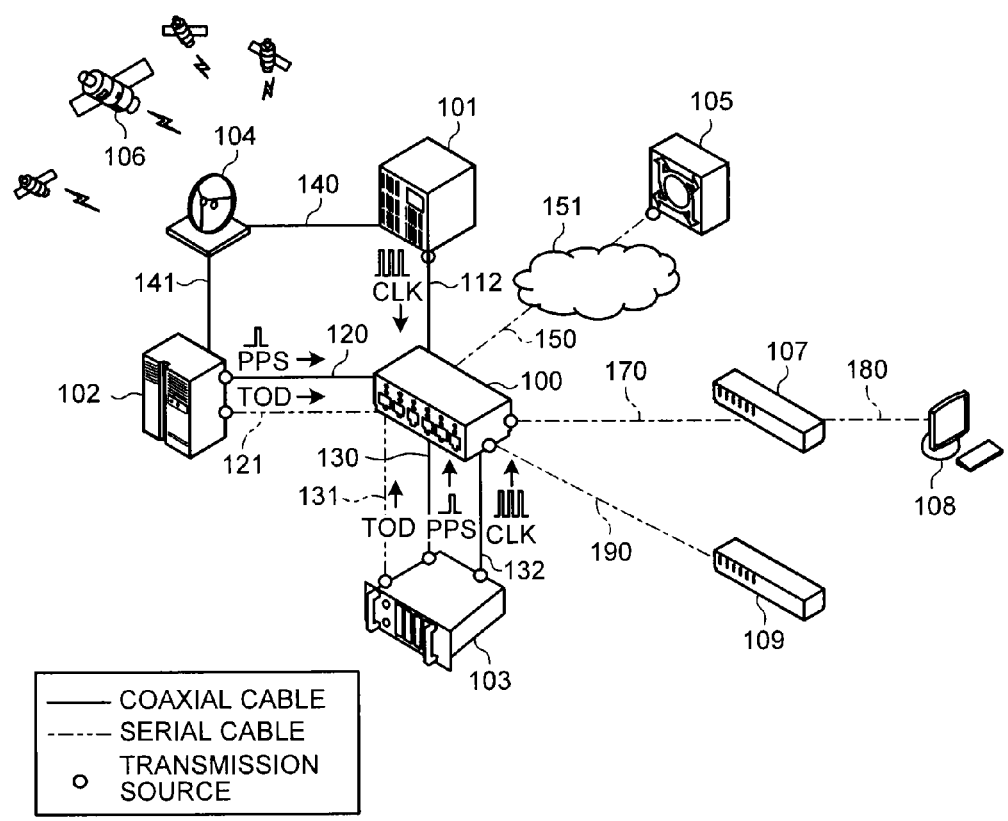
FIG. 1 is a diagram illustrating a configuration example of a communication system according to the present invention.

FIG. 1 is a diagram illustrating a configuration example of a communication system according to the present invention. A communication apparatus (a master) 100 and communication apparatuses (slaves) 107 and 109 are respectively connected via wired lines 170 and 190. A terminal 108 is connected to the communication apparatus (the slave) 107 via a wired line 180. The communication apparatus (the master (a master apparatus)) 100 supplies time information and a clock signal to the communication apparatuses (the slaves (slave apparatuses)) 107 and 109 respectively via the wired lines 170 and 190. The communication apparatus (the master) 100 is connected to a clock source (a reference clock source) 101 via a coaxial cable 112. The communication apparatus (the master) 100 is connected to a time source (a reference time source) 102 via a coaxial cable 120 and via a serial cable 121. The communication apparatus (the master) 100 is connected to a clock and time source (a reference clock source and a reference time source) 103 via coaxial cables 130 and 132 and via a serial cable 131. The communication apparatus (the master) 100 is connected to a clock and time source 105 via a wired line 150 and networks 151. The clock source 101, the time source 102, and the clock and time sources 103 and 105 supply clock signals and time information to the communication apparatus (the master) 100 via this connection. The clock source 101 and the time source 102 are connected to a GPS receiver 104 respectively via coaxial cables 140 and 141 and respectively generate a clock and time information on the basis of high-accuracy time information supplied from a GPS satellite 106.

In the following description, in the embodiment, an example is described in which a master apparatus and a slave apparatus are connected via a wired line using IEEE1588-2008 as a time information transmission protocol and using ITU-T G.8265.1 as a transmission rate request change protocol. However, protocols and configurations to be used are not limited to these protocols and configurations. The present invention can be applied to not only conventional protocols via networks such as NTP/SNTP (Simple Network Time Protocol) but also specific protocols for industrial uses such as EtherCAT (registered trademark). The present invention is not limited to the protocols described above.

The configuration example illustrated in FIG. 1 is only an example. The numbers of clock sources, time sources, and clock and time sources connected to the communication apparatus (the master) 100 are not limited to examples respectively illustrated in FIG. 1. The number of communication apparatuses (slaves) connected to the communication apparatus (the master) 100 is not limited to an example illustrated in FIG. 1. In the example illustrated in FIG. 1, the communication apparatus (the master) 100 and the communication apparatuses (the slaves) 107 and 109 are connected by wired lines; however, they can be also connected by wireless lines.

A concept of a time synchronization control method associated with clock synchronization control according to the embodiment is described here. Note that, in the embodiment, a synchronization system of a tree configuration connected by wired lines is described as an example below. However, the embodiment of the present invention is not limited to the synchronization system of the tree configuration alone (and it can be, for example, a full-mesh configuration). The synchronization system can be used together with other synchronization technologies that use radio and the like, and is not limited to a line medium and by transmission speed. Further, a time synchronization interface is not limited to a PPS (Pulse Per Second) signal plus TOD (Time Of Day) serial signal format described below and can be, for example, an IRIG signal. There is no limitation on the time synchronization interface.

Figure 2:
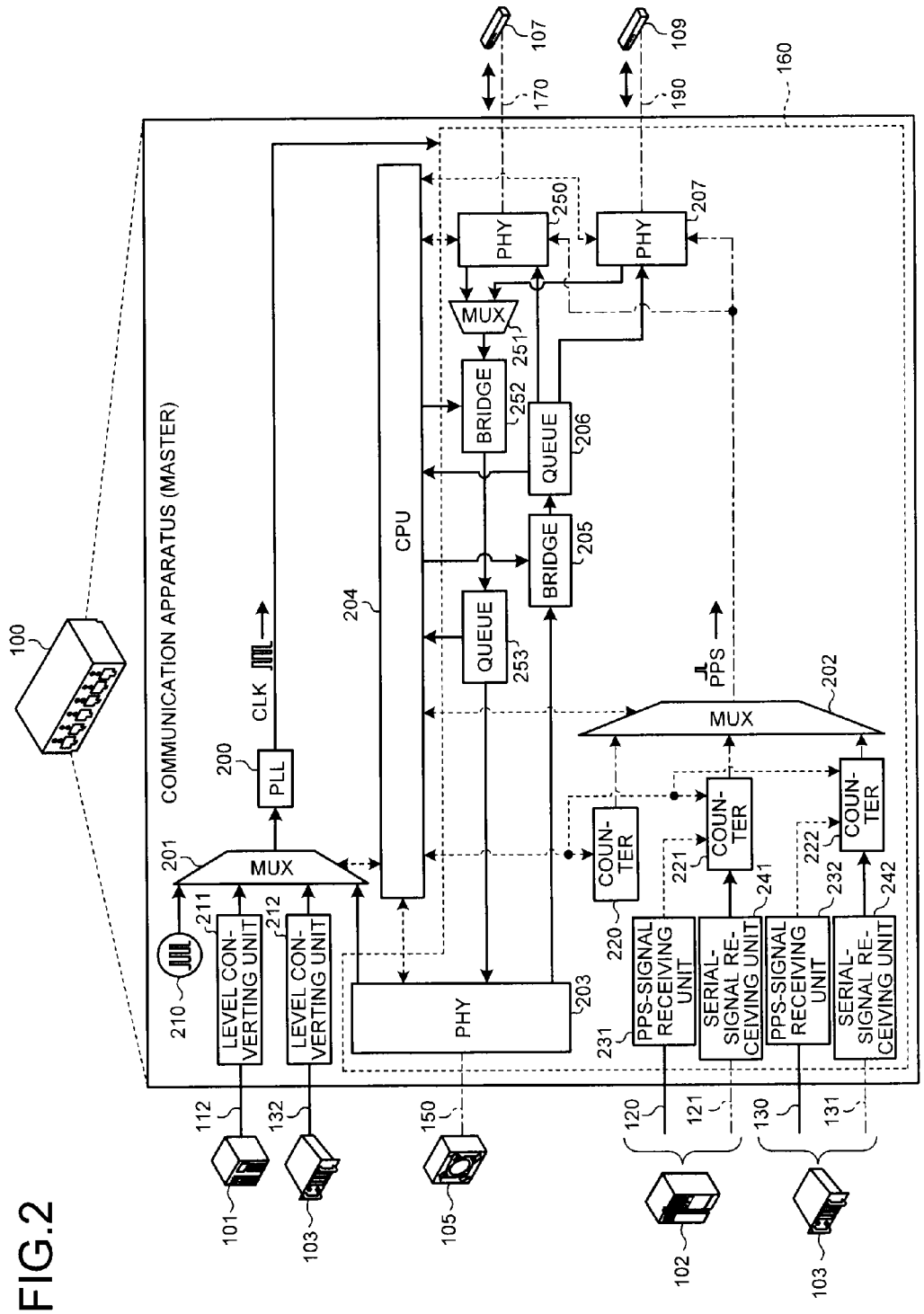
FIG. 2 is a diagram illustrating a configuration example of a communication apparatus (a master).

FIG. 2 is a diagram illustrating a configuration example of the communication apparatus (the master) 100 in the embodiment. The communication apparatus (the master) 100 includes PHYs (physical-layer processing units) 203, 250, and 207; MUXs (Multiplexers) 201, 202, and 251; level converting units 211 and 212; a clock (an its own clock generating unit) 210; a PLL (Phase Locked Loop) circuit 200; a CPU (Central Processing Unit) 204; queues 206 and 253; bridges 205 and 252; counters 220, 221, and 222; PPS-signal receiving units 231 and 232; and serial-signal receiving units 241 and 242. An area 160 indicates a PLL CLK synchronization area supplied from the PLL 200.

The PHYs 250 and 207 are respectively connected to the communication apparatuses (the slaves) 107 and 109 via the wired lines 170 and 190. The level converting units 211 and 212 are respectively connected to the clock source 101 and the clock and time source 103 via the coaxial cables 112 and 132. The level converting unit 211 extracts a clock from the clock source 101 and inputs the extracted clock (a first clock signal) to the MUX circuit 201. The level converting unit 212 extracts a clock from the clock and time source 103 and inputs the extracted clock (a second clock signal) to the MUX circuit 201. The PHY 203 is connected to the clock and time source 105 via the wired line 150. The PHY 203 extracts a clock from the clock and time source 105 and inputs the extracted clock (a third clock signal) to the MUX circuit 201. Note that the PHY 203 includes a function of extracting a clock; however, the function can be separately provided. The clock 210 generates a clock (its own clock) in its own apparatus and inputs the generated clock (a fourth clock signal) to the MUX circuit 201.

The MUX circuit 201 selects a clock from a plurality of clock sources (the clock source 101, the clock and time sources 103 and 015, and the clock 210) and supplies the selected clock to the PLL circuit 200. The PLL circuit 200 multiplies the supplied clock to a frequency suitable for the circuits and causes the communication apparatus (the master) 100 to operate.

The PSS-signal receiving units 231 and 232 are respectively connected to the time source 102 and the clock and time source 103 via the coaxial cables 120 and 130. The PPS-signal receiving units 231 and 232 respectively receive PPS signals from the time source 102 and the clock and time source 103 and respectively input the PPS signals to the counters 221 and 222. The serial-signal receiving units 241 and 242 respectively extract ASCII character strings from serial signals received from the time source 102 and the clock and time source 103 via the serial cables 121 and 131 and perform a format analysis so as to extract information such as UTC (Coordinated Universal Time) and GMT (Greenwich Mean Time) and output the information to the counters 221 and 222. The counters 221 and 222 respectively output, with PPS signals that are output from the PPS-signal receiving units 231 and 232 as triggers, capture time information output that is output from the serial-signal receiving units 241 and 242, and continue to count time with a clock supplied from the PLL 200 until the next time information is captured. In this way, time (a first time signal) from the time source 102 and time (a second time signal) from the clock and time source 103 are received.

The PHY 203 receives a frame, which is superimposed with time information transmitted from the clock and time source 105 connected via the wired line 150, and inputs the received frame to the bridge 205. The bridge 205 analyzes the destination of the input frame and determines whether the frame is addressed to the CPU 204, addressed to the communication apparatuses (the slaves) 107 and 109, or to be discarded. The frame after the determination is queued in the queue 206 for each of the destinations. The queue 206 includes individual queues for each of the destinations (to the CPU 204, to the PHY 207, and to the PHY 250). The CPU 204 extracts, from the queue 206, a frame superimposed with time information stored in the individual queue corresponding to the CPU 204; scrutinizes the frame; acquires the reception time of the frame from the PHY 203; and sets, in the counter 220, a result obtained by performing a predetermined calculation on the basis of the reception time and the time information. The counter 220 retains the time information (the result obtained by performing the predetermined calculation) and generates a PPS signal on the basis of a setting from the CPU 204. The counter 220 continues to count time with the clock from the PLL 200 until the next setting from the CPU 204 is applied. In this way, the clock and time source 105 (a third time signal) is received.

The counters 220, 221, and 222 input, to the MUX circuit 202, PPS signals that are input thereto from the time sources. The MUX circuit 202 selects one among the input plurality of PPS signals and supplies the selected PPS signal to the PHYs 250 and 207. The CPU 204 collects time information from a counter (any one of the counters 220, 221, and 222) that is the same as the counter from which the PPS signal is selected by the MUX circuit 202 and sets the time information in the PHYs 250 and 207.

The PHYs 250 and 207 respectively receive the frames transmitted, via the wired lines 170 and 190, from the communication apparatuses (the slaves) 107 and 109 and input the received frames to the MUX circuit 251. The MUX circuit 251 multiplexes the frames from the communication apparatuses (the slaves) 107 and 109 and transfers the multiplexed frame to the bridge 252. The bridge 252 determines which of the CPU 204, the clock and time source 105, and another apparatus on the network 151 to which the multiplexed frame is addressed. After the destination has been determined, the multiplexed frame is queued into as per its destination in the queue 253. The queue 253 includes individual queues for the respective destinations. The CPU 204 extracts a frame superimposed with the time information stored in the individual queue corresponding thereto from the queue 253 and scrutinizes the frame. As a result of the scrutiny, the CPU 204 specifies the PHY (the PHY 250 or the PHY 207) that receives the frame; acquires the reception time of the frame from the specified PHY; sets, in the frame, a result obtained by performing a predetermined calculation on the basis of the reception time and the time information; and transmits the frame to the transmission source (the communication apparatus (the slave) 107 or the communication apparatus (the slave) 109). Note that the transmission standard of the PHYs 250 and 207 that connect the communication apparatus (the master) 100 and the communication apparatuses (the slaves) 107 and 109 depends on the implementation. The present invention is not limited by a transmission standard.

Figure 3:
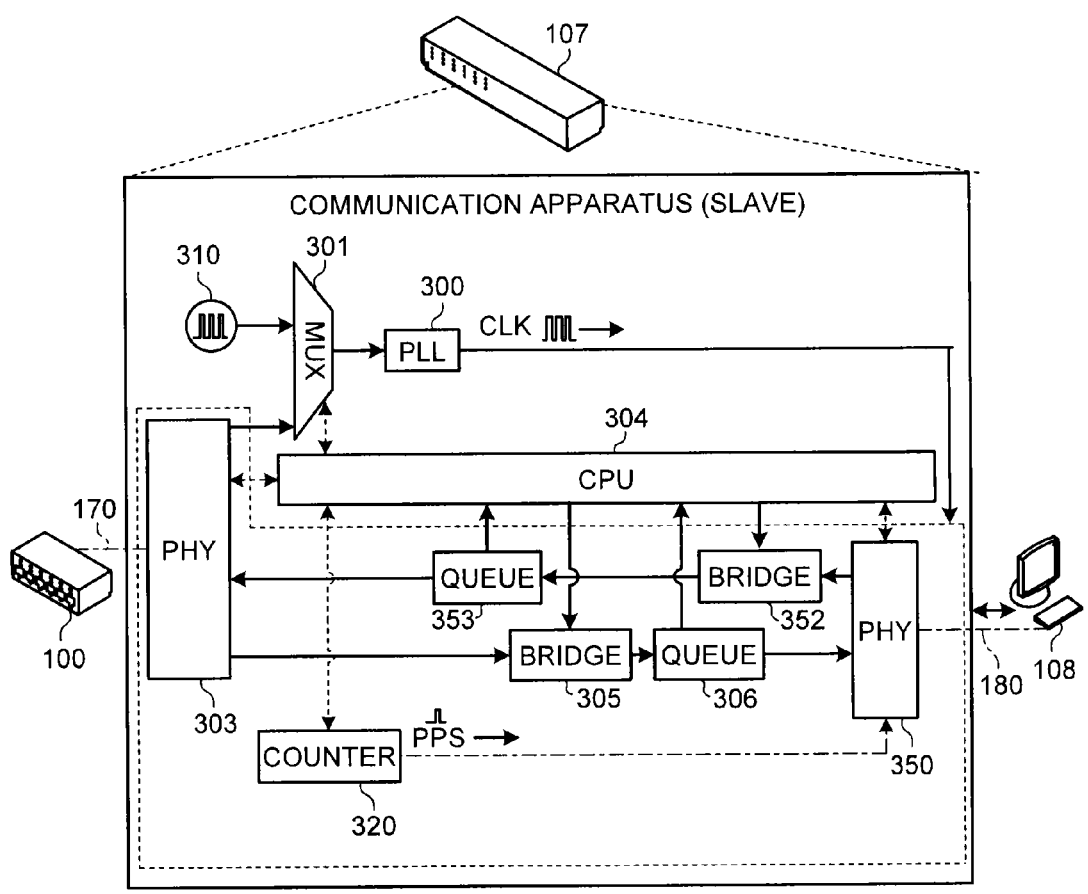
FIG. 3 is a diagram illustrating a configuration example of a communication apparatus (a slave).

FIG. 3 is a diagram illustrating a configuration example of the communication apparatus (the slave) 107 in the embodiment. The communication apparatus (the slave) 107 includes PHYs 303 and 350, a MUX circuit (an MUX) 301, a clock (its own clock generating unit) 310, a PLL circuit (a PLL) 300, a CPU (a control unit) 304, queues 306 and 353, bridges 305 and 352, and a counter 320.

The PHY 303 is connected to the communication apparatus (the master) 100 via the wired line 170. The PHY 303 extracts a clock from the communication apparatus (the master) 100 and inputs the extracted clock to the MUX circuit 301. Note that the PHY 303 has a function of a clock extracting unit that extracts a clock; however, the clock extracting unit can be provided separately from the PHY 303. The clock 310 generates a clock (its own clock) in its own apparatus and inputs the generated clock to the MUX circuit 301.

The MUX circuit 301 selects one of clocks from a plurality of clock sources (the communication apparatus (the master) 100 and the clock 210) and supplies the selected clock to the PLL circuit 300. The PLL circuit 300 multiplies the supplied clock to a frequency suitable for the circuits and causes the communication apparatus (the slave) 107 to operate.

The PHY 303 is connected to the communication apparatus (the master) 100 via the wired line 170. The PHY 303 receives a frame multiplied with time information transmitted from the communication apparatus (the master) 100 and inputs the frame to the bridge 305. The bridge 305 analyzes the destination of the input frame and determines whether the frame is addressed to the CPU 304, addressed to the terminal 108, or is to be discarded. The frame after the determination is queued as per its destinations in the queue 306. The queue 306 includes individual queues for each of the destinations (addressed to the CPU 304 and the PHY 350). The CPU 304 extracts a frame superimposed with time information stored in the individual queue corresponding to the queue 306; scrutinizes the frame; acquires reception time of the frame from the PHY 303; and sets, in the counter 320, a result obtained by performing predetermined calculation on the basis of the reception time and the time information. The counter 320 retains the time information (the result obtained by performing the predetermined calculation) and generates a PPS signal on the basis of a setting from the CPU 304. The counter 320 continues to count time with a clock from the PLL 300 until the next setting from the CPU 304 is acquired.

The counter 320 supplies the generated PPS signal to the PHY 350. The CPU 304 collects time information from the counter 320 and sets the time information in the PHY 350. The PHY 350 receives, via the wired line 180, the frame transmitted from the terminal 108 and transfers the received frame to the bridge 352. The bridge 352 analyzes a destination of the input frame and determines whether the frame is addressed to the CPU 304, addressed to the communication apparatus (the master) 100, or is to be discarded. After the determination, the frame is queued as per destinations in the queue 353. The queue 353 includes individual queues for the respective destinations (the CPU 304 and the PHY 303). The CPU 304 extracts a frame superimposed with time information stored in the individual queue corresponding thereto from the queue 353; scrutinizes the frame; acquires reception time of the frame from the PHY 350; sets, in the frame, a result obtained by performing predetermined calculation on the basis of the reception time and the time information; and transmits the frame to the terminal 108, which is the transmission source. Note that a transmission standard of the PHY 350 that connects the communication apparatus (the slave) 107 and the terminal 108 depends on implementation. The present invention is not limited by the transmission standard.

Figure 4:
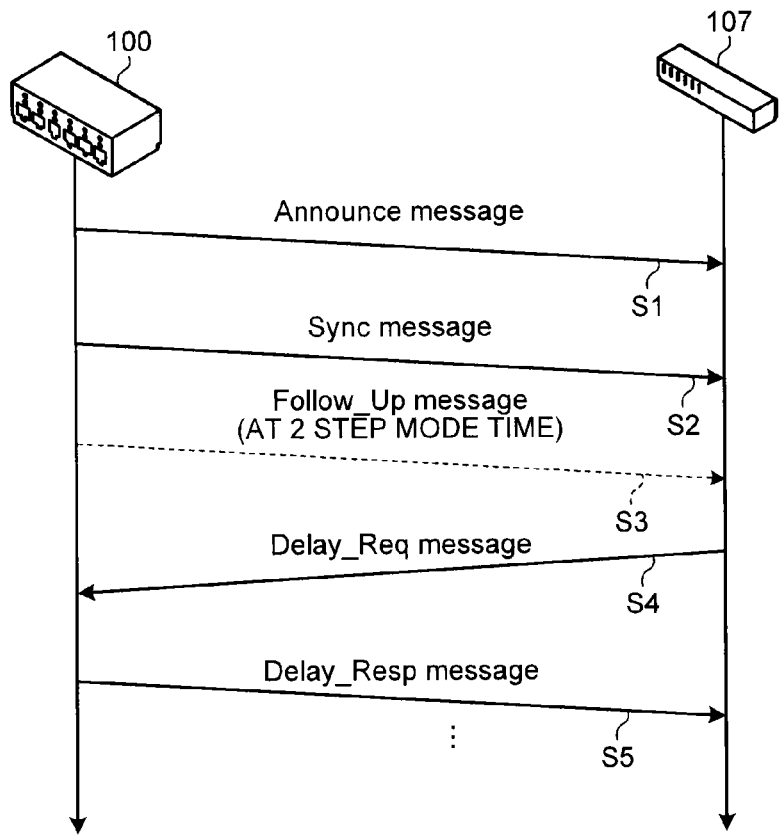
FIG. 4 is a chart illustrating an example of a procedure of clock and time synchronization conforming to IEEE1588-2008.

FIG. 4 is a chart illustrating an example of a procedure of clock and time synchronization conforming to IEEE1588-2008 performed between the communication apparatus (the master) 100 and the communication apparatus (the slave) 107. The communication apparatus (the master) 100, which is a master, transmits an Announce message for notifying time attribute information (presence or absence of leap second, time source accuracy, etc.) of its own apparatus and a Sync message in which the transmission time of transmission from the CPU is stored, respectively at fixed cycles (steps S1 and S2). In a 2 STEP mode used for the purpose of compensating for the inability to overwrite a transmission time storage area in the Sync message with transmission time immediately before the Sync message is transmitted from the PHY, the communication apparatus (the master) 100 transmits a Follow_Up message in which transmission time (time of transmission from the PHY) of the immediately preceding Sync message transmitted from the PHY is stored (step S3). The communication apparatus (the slave) 107, which is a slave, transmits a Delay_Req message to the communication apparatus (the master) 100 (step S4) and records the transmission time of the Delay_Req message. The communication apparatus (the master) 100 transmits, on receiving the Delay_Req message from the communication apparatus (the slave) 107 as a trigger, to the communication apparatus (the slave) 107, a Delay_Resp message in which the time of the reception of the Delay_Req message is stored (step S5). The communication apparatus (the slave) 107 calculates the difference between the time of the communication apparatus (the master) 100 and the time of the communication apparatus (the slave) 107 on the basis of the transmission time stored in the Sync message (during the 1 STEP Mode) or the Follow_Up message (during the 2 STEP mode), the reception time of the Sync message, the transmission time of the Delay_Req message, and the reception time of the Delay_Req message in the communication apparatus (the master) 100 stored in the Delay_Resp message; and then corrects the calculated difference so as to thereby realize time synchronization with the communication apparatus (the master) 100.

Figure 5:
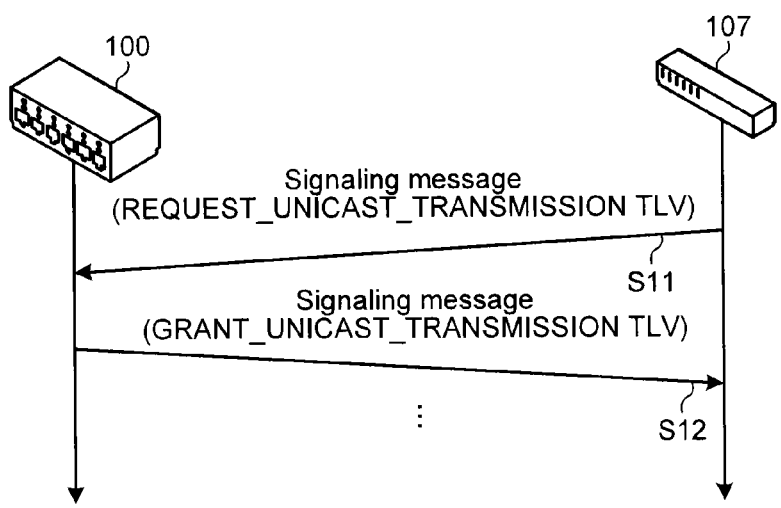
FIG. 5 is a chart illustrating an example of a procedure that requests a unicast transmission of a Sync message, a Pdelay_Resp message, a Delay_Resp message, and an Announce message on the basis of ITU-T G.8265.1 by using a Signaling message specified in IEEE1588-2008.

FIG. 5 is a chart illustrating an example of a procedure that performs a request for a unicast transmission of a Sync message, a Pdelay_Resp message, a Delay_Resp message, and an Announce message on the basis of ITU-T G.8265.1 by using a Signaling message specified in IEEE1588-2008. With IEEE1588-2008, messages used for clock and time synchronization can be unicast-transmitted. With IEEE1588-2008, a Pdelay_Req message, a Pdelay_Resp message, and the like are also defined besides the messages illustrated in FIG. 4. When requesting unicast transmission of a Sync message, a Pdelay_Resp message, a Delay_Resp message, and an Announce message, as illustrated in FIG. 5, the communication apparatus (the slave) 107, which is the slave, transmits a Signaling message (REQUEST_UNICAST_TRANSMISSION TLV) that requests unicast transmission to the communication apparatus (the master) 100 (step S11). A format definition of the Signaling message that requests unicast transmission is described below with reference to FIG. 8 and subsequent illustrations. When receiving the Signaling message, the communication apparatus (the master) 100 determines whether the request (the unicast transmission request) from the communication apparatus (the slave) 107 is realizable and transmits a Signaling message (GRANT_UNICAST_TRANSMISSION TLV) reflecting a result of the determination to the communication apparatus (the slave) 107 (step S12). Due to this procedure, when the request from the communication apparatus (the slave) 107 can be satisfied, a message requested from the communication apparatus (the slave) 107 among a Sync message, a Pdelay_Resp message, a Delay_Resp message, and an Announce message is returned from the communication apparatus (the master) 100 to the communication apparatus (the slave) 107 by a unicast transmission.

Figure 6:
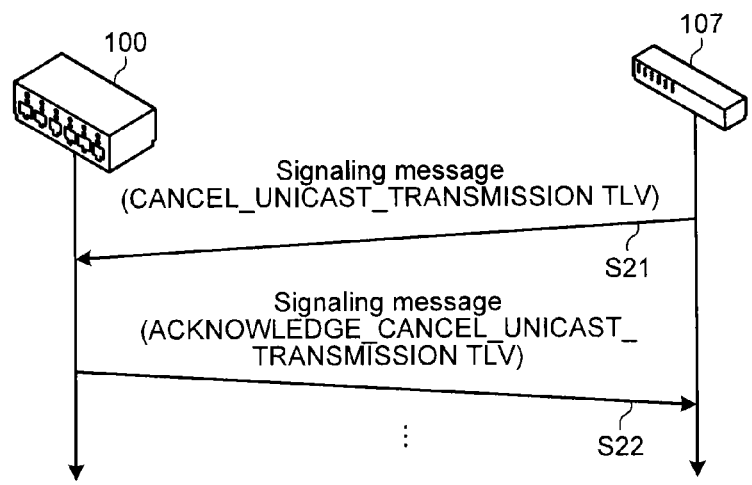
FIG. 6 is a chart illustrating an example of a procedure for requesting the cancelling of a unicast transmission of a Sync message, a Pdelay_Resp message, a Delay_Resp message, and an Announce message on the basis of ITU-T G.8265.1 by using a Signaling message specified in IEEE1588-2008.

FIG. 6 is a chart illustrating an example of a procedure for requesting the cancelling of a unicast transmission of a Sync message, a Pdelay_Resp message, a Delay_Resp message, and an Announce message on the basis of ITU-T G.8265.1 by using a Signaling message specified in IEEE1588-2008. When stopping transmission of a Sync message, a Pdelay_Resp message, a Delay_Resp message, and an Announce message from the communication apparatus (the master) 100, the communication apparatus (the slave) 107, which is the slave, transmits a Signaling message (CANCEL_UNICAST_TRANSMISSION TLV) that requests the cancelling of unicast transmission to the communication apparatus (the master) 100 (step S21). When receiving a Signaling message (ACKNOWLEDGE_CANCEL_UNICAST_TRANSMISSION TLV) that requests the cancelling of unicast transmission, the communication apparatus (the master) 100 performs the process involved in the cancellation request from the communication apparatus (the slave) 107 and returns a Signaling message for notifying the communication apparatus (the slave) 107 that the cancellation is recognized (step S22).

Figure 7:
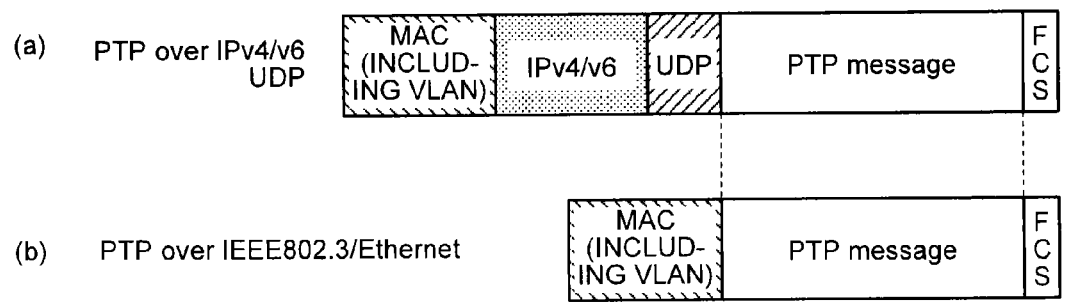
FIG. 7 is a diagram illustrating an example of a frame configuration obtained by encapsulating a PTP (Precision Time Protocol) message specified in IEEE1588-2008.

FIG. 7 is a diagram illustrating an example of a frame configuration obtained by encapsulating a PTP (Precision Time Protocol) message specified in IEEE1588-2008. The PTP message includes the following messages: Announce/Sync/Delay_Req/Follow_Up/Delay_Resp/Pdelay_Req/Pdelay_Resp/Pdelay_Resp_Follow_Up/Signaling/Management. In FIG. 7(*a*), a configuration example of an encapsulated frame used in communication performed according to PTP over IPv4/v6/UDP is illustrated. In FIG. 7(*b*), a configuration example of an encapsulated frame used in communication performed according to PTP over IEEE802.3/Ethernet (registered trademark) is illustrated.

Figure 8:
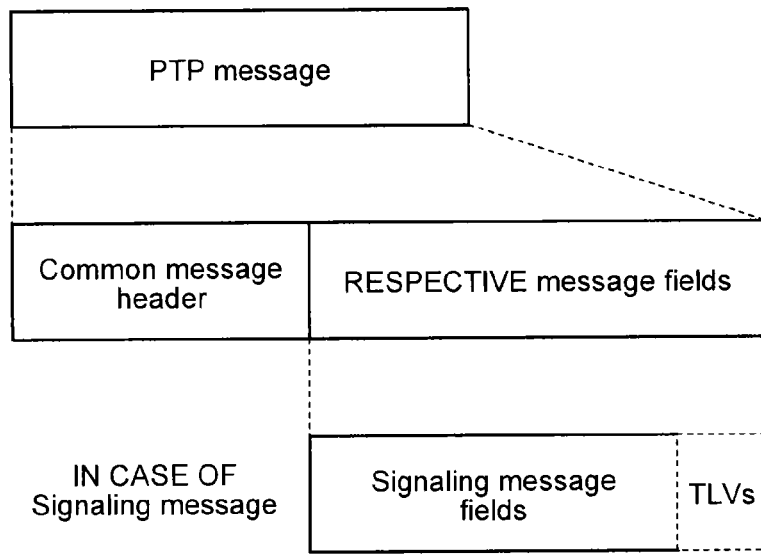
FIG. 8 is a diagram illustrating a format example of the PTP message.

FIG. 8 is a diagram illustrating a format example of a PTP message. As illustrated in FIG. 8, the PTP message is configured from a Common message header and message fields. In the Common message header, identifiers for identifying types (Announce/Sync/Delay_Req/Follow_Up/Delay_Resp/Pdelay_Req/Pdelay/Resp/Pdelay_Resp_Follow_Up/Signaling/Management) of messages are stored. Among them, in the case of a Signaling message, message fields are configured from a Signaling message field and a plurality of TLVs (Type, Length, and Value).

Figure 9:
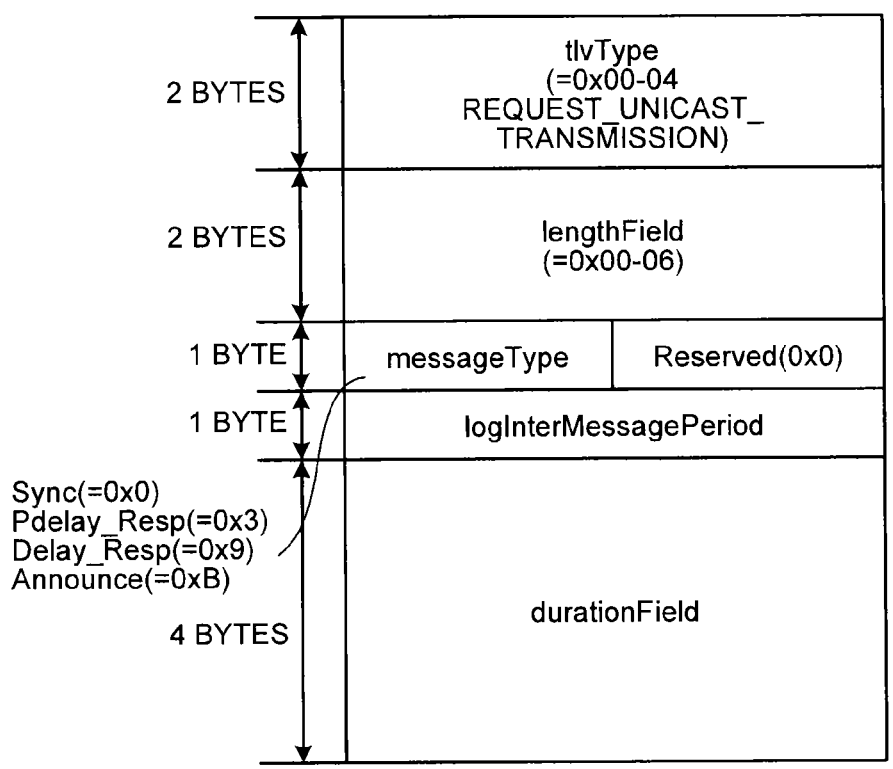
FIG. 9 is a diagram illustrating a format example of a message (REQUEST_UNICAST_TRANSMISSION TLV) that requests unicast transmission (unicast transmission of a Sync message, a Pdelay_Resp message, a Delay_Resp message, and an Announce message) transmitted from the slave among a Signaling message.

FIG. 9 is a diagram illustrating a format example of a message (REQUEST_UNICAST_TRANSMISSION TLV) that requests a unicast transmission (unicast transmission of a Sync message, a Pdelay_Resp message, a Delay_Resp message, and an Announce message) to be transmitted from the slave among a Signaling message. The message includes the following areas: tlvType, lengthField, messageType, logInterMessagePeriode, and durationField. In the tlvType, a message type REQUEST_UNICAST_TRANSMISSION is stored. In the lengthField, the subsequent length of the data is stored. In the messageType, information for specifying a unicast transmission request target message among a Sync message, a Pdelay_Resp message, a Delay_Resp message, and an Announce message is stored. In the logInterMessagePeriode, information indicating a transmission rate of a message designated by messageType transmitted from the master is stored. In the durationField, information indicating a validity period (a duration time) of a request for a unicast transmission of a message designated by the messageType is stored.

Figure 10:
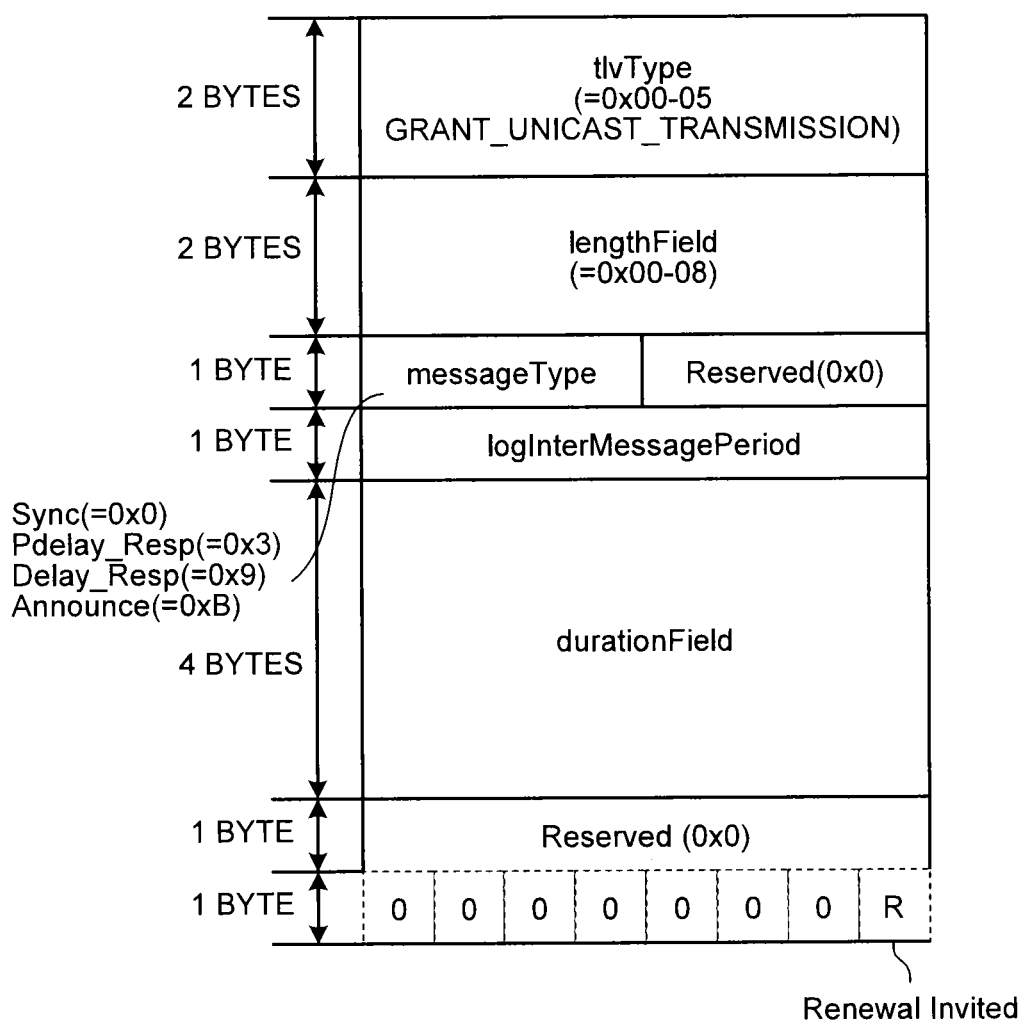
FIG. 10 is a diagram illustrating a format example of a response message (GRANT_UNICAST_TRANSMISSION TLV) of a unicast transmission request transmitted from the master among the Signaling message.

FIG. 10 is a diagram illustrating a format example of a response message (GRANT_UNICAST_TRANSMISSION TLV) of a unicast transmission request transmitted from the master among the Signaling message. The message includes areas of tlvType, lengthField, messageType, logInterMessagePeriode, durationField, and Renewal Invited. In the tlvType, information indicating a message type (GRANT_UNICAST_TRANSMISSION) is stored. In the lengthField, the subsequent length of the data is stored. In the messageType, information for identifying a unicast transmission request response target message among a Sync message, a Pdelay_Resp message, a Delay_Resp message, and an Announce message is stored. In the logInterMessagePeriode, information indicating a transmission rate of a message designated by the messageType is stored. In the durationField, information indicating a validity period (a duration time) of a request for a unicast transmission of a message designated by the messageType is stored. In the Renewal Invited, information indicating whether the master accepts a request in response to a unicast transmission request from the slave is stored. In the example illustrated in FIG. 10, in the Renewal Invited, "b1b" is stored if the master accepts the request and "b0b" is stored if the master does not accept the request ("bx", x=0 or 1 indicates a bit value).

Figure 11:
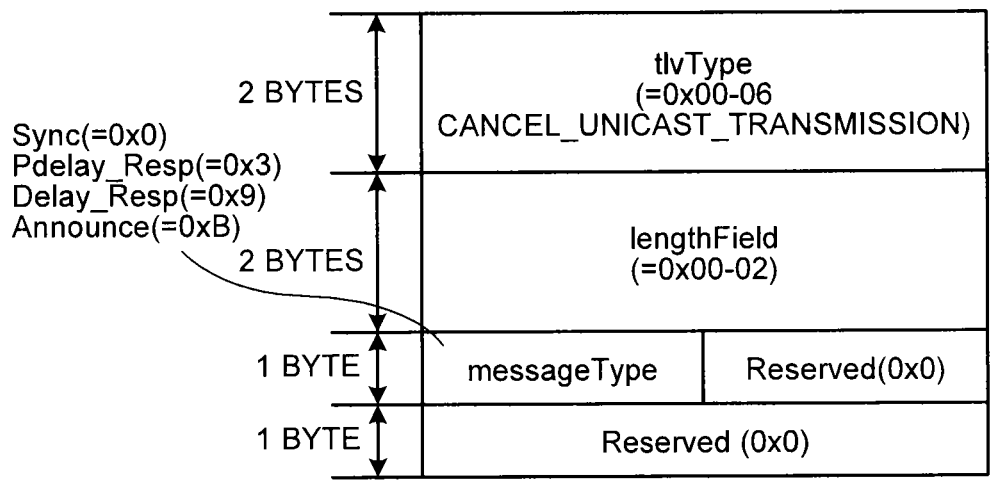
FIG. 11 is a diagram illustrating a format example of a message (CANCEL_UNICAST_TRANSMISSION TLV) that requests unicast transmission cancellation (cancellation of unicast transmission of a Sync message, a Pdelay_Resp message, a Delay_Resp message, and an Announce message) transmitted from the slave among the Signaling message.

FIG. 11 is a diagram illustrating a format example of a message (CANCEL_UNICAST_TRANSMISSION TLV) that requests unicast transmission cancellation (cancellation of unicast transmission of a Sync message, a Pdelay_Resp message, a Delay_Resp message, and an Announce message) transmitted from the slave among the Signaling message. The message includes areas of tlvType, lengthField, and messageType. In the tlvType, information indicating a message type (CANCEL_UNICAST_TRANSMISSION) is stored. In the lengthField, the subsequent length of the data is stored. In the messageType, information for identifying a unicast transmission cancellation request target message among a Sync message, a Pdelay_Resp message, a Delay_Resp message, and an Announce message is stored.

Figure 12:
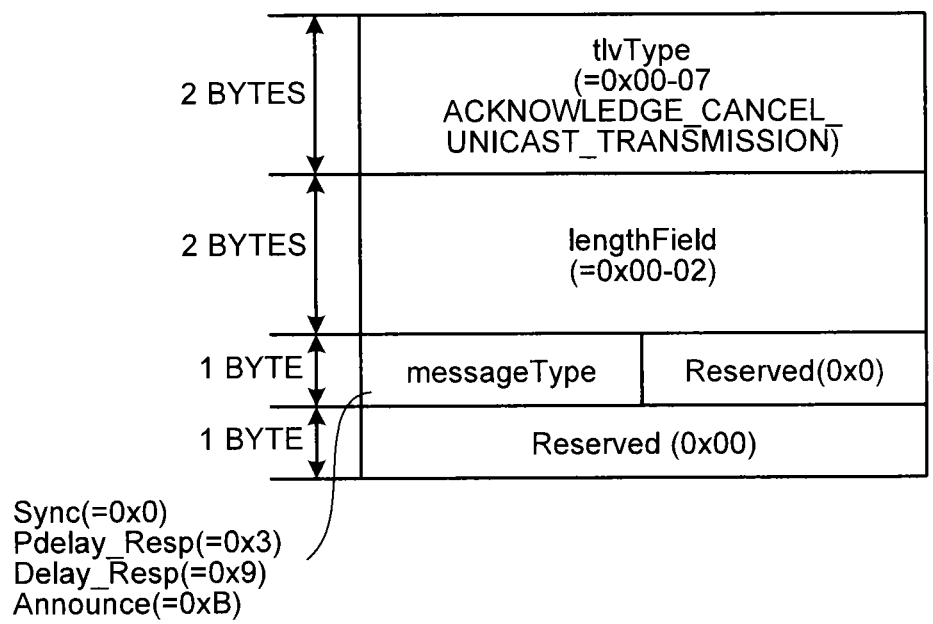
FIG. 12 is a diagram illustrating a format example of a unicast transmission cancellation response message (ACKNOWLEDGE_CANCEL_UNICAST_TRANSMISSION TLV) transmitted from the master among the Signaling message.

FIG. 12 is a diagram illustrating a format example of a unicast transmission cancellation response message (ACKNOWLEDGE_CANCEL_UNICAST_TRANSMISSION TLV) transmitted from the master among the Signaling message. The message includes areas of tlvType, lengthField, and messageType. In the tlvType, information indicating a message type (ACKNOWLEDGE_CANCEL_UNICAST_TRANSMISSION) is stored. In the lengthField, the subsequent length of the data is stored. In the messageType, information for identifying a unicast transmission cancellation response target message among a Sync message, a Pdelay_Resp message, a Delay_Resp message, and an Announce message is stored.

Figure 13:
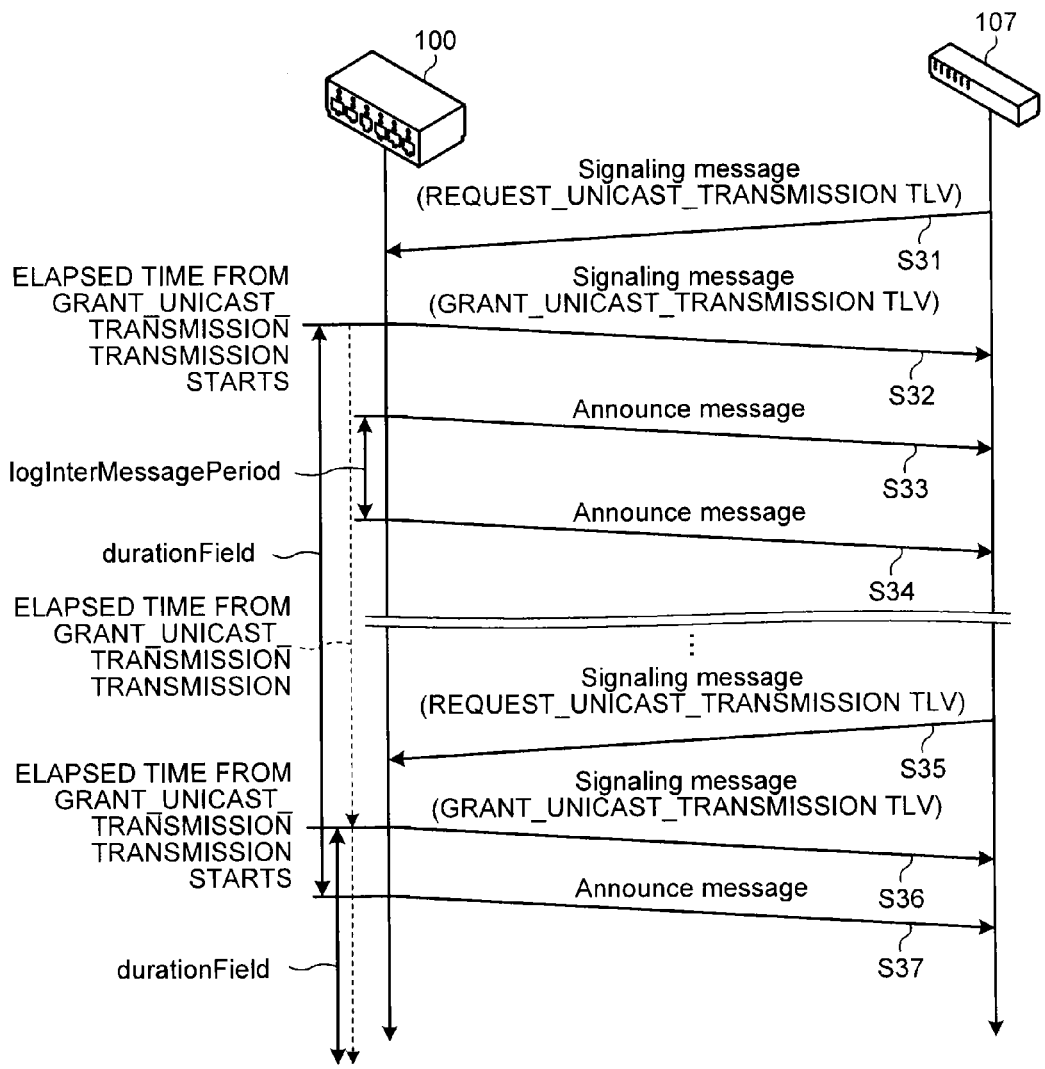
FIG. 13 is a chart illustrating an example of a transmission procedure of a message performed when clock and time synchronization According to IEEE1588-2008 is carried out in accordance with a procedure specified in ITU-T G.8265.1.

FIG. 13 is a chart illustrating an example of a transmission procedure of a message performed when clock and time synchronization in accordance with IEEE1588-2008, which is performed between the communication apparatus (the master) 100 and the communication apparatus (the slave) 107, is carried out in accordance with a procedure specified in ITU-T G.8265.1. In FIG. 13, transmission of an Announce message is illustrated as an example. Transmission of a Sync message, a Pdelay_Resp message, and a Delay_Resp message is the same as the transmission of the Announce message.

As illustrated in FIG. 13, the communication apparatus (the slave) 107 transmits, to the communication apparatus (the master) 100, a Signaling message requesting a unicast transmission of an Announce message (step S31). The communication apparatus (the master) 100 transmits a Signaling message admitting the unicast transmission request to the communication apparatus (the slave) 107 (step S32). Thereafter, during a validity period designated by a durationField of the Signaling message that requests unicast transmission, the communication apparatus (the master) 100 transmits the Announce message to the communication apparatus (the slave) 107 at a fixed cycle (steps S33 and S34).

Before the validity period designated by the durationField elapses since the transmission of the Signaling message for admitting the unicast transmission request, the communication apparatus (the slave) 107 transmits again the Signaling message requesting the unicast transmission of the Announce message (step S35). The communication apparatus (the master) 100 transmits the Signaling message for admitting the unicast transmission request to the communication apparatus (the slave) 107 (step S36). Consequently, even after the validity period designated by the last durationField elapses, the communication apparatus (the master) 100 transmits the Announce message to the communication apparatus (the slave) 107 (step S37).

Figure 14:
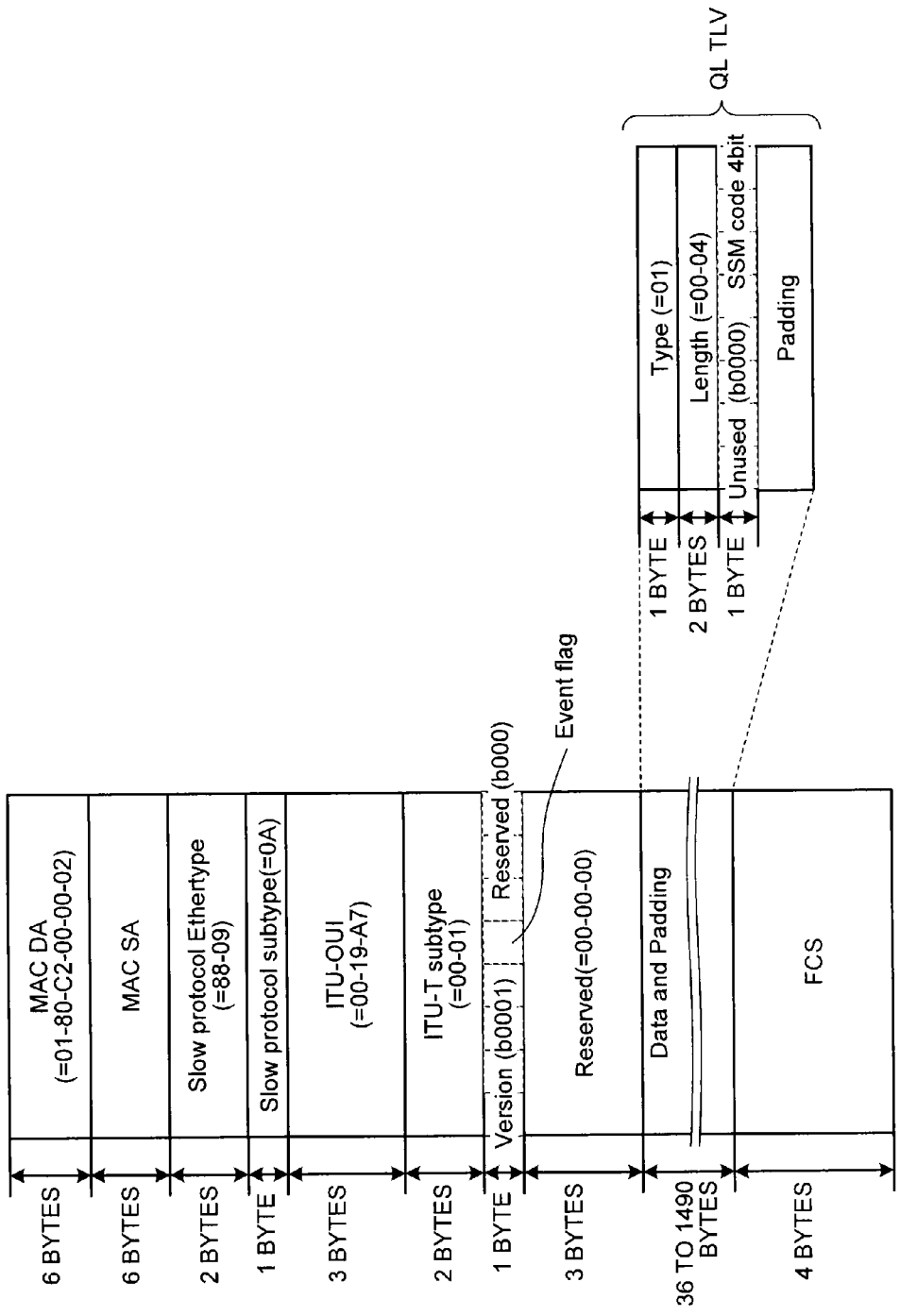
FIG. 14 is a diagram illustrating a format example of an ESMC (Ethernet (registered trademark) Synchronization Messaging Channel) PDU (Protocol Data Unit) specified in ITU-T G.8264.

FIG. 14 is a diagram illustrating a format example of an ESMC (Ethernet (registered trademark) Synchronization Messaging Channel) PDU (Protocol Data Unit) specified in ITU-T G.8264. The ESMC PDU is used in indicating a clock supply state from the master to the slave via a line. The slave side determines a clock supply state from the master on the basis of a reception state of the ESMC PDU, a value of an SSM (Synchronization Status Message) code (synchronization information of a reference clock source) of the received ESMC PDU, and a clock extraction state from a line through which the slave is connected to the master.

Figure 15:
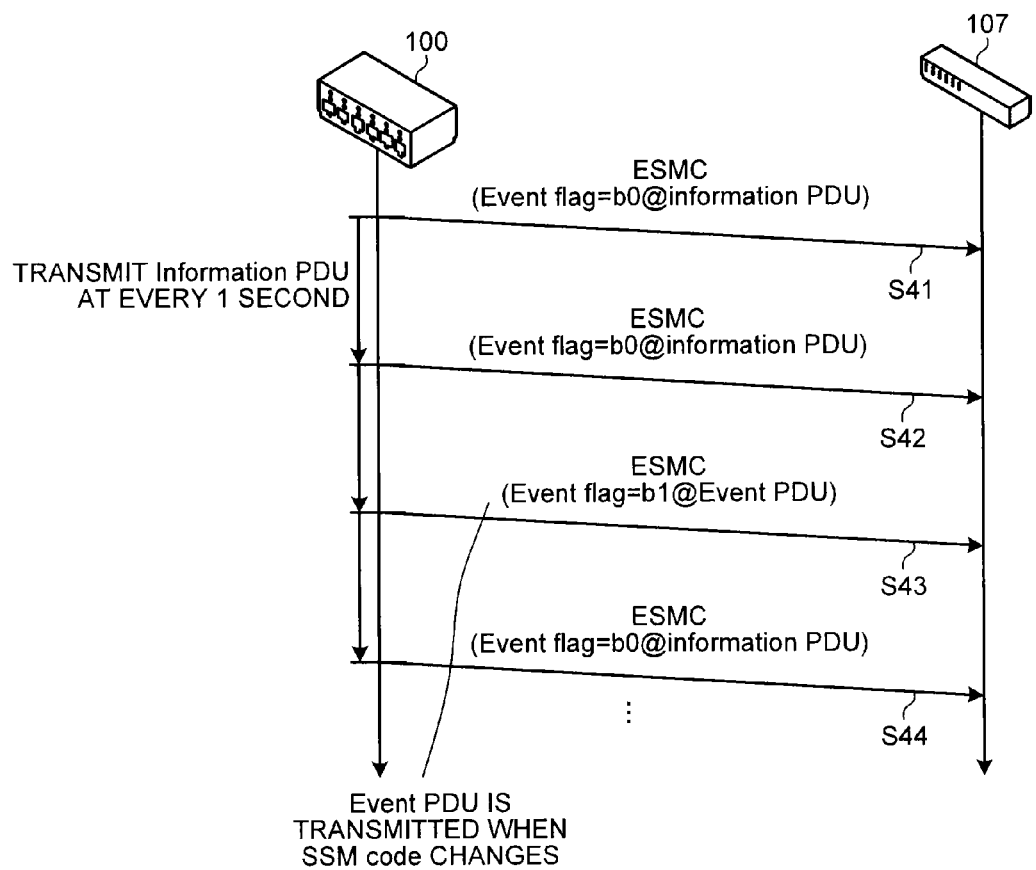
FIG. 15 is a chart illustrating a transmission procedure example of the ESMC PDU.

FIG. 15 is a chart illustrating a transmission procedure example of the ESMC PDU. If the value of the SSM code is the same as an immediately preceding value transmitted to the communication apparatus (the slave) 107, the communication apparatus (the master) 100 transmits an ESMC PDU, in which an Event flag is set to "b0", as an Information PDU at every one second (steps S41, S42, and S44). On the contrary, when the value of the SSM code is different from the immediately preceding value transmitted to the communication apparatus (the slave) 107 (when the clock supply state changes), the communication apparatus (the master) 100 transmits an ESMC PDU, in which an Event Flag 1 is set to "b1", to the communication apparatus (the slave) 107 as an event PDU as soon as a change in the value of the SSM code is detected (step S43).

Figure 16:
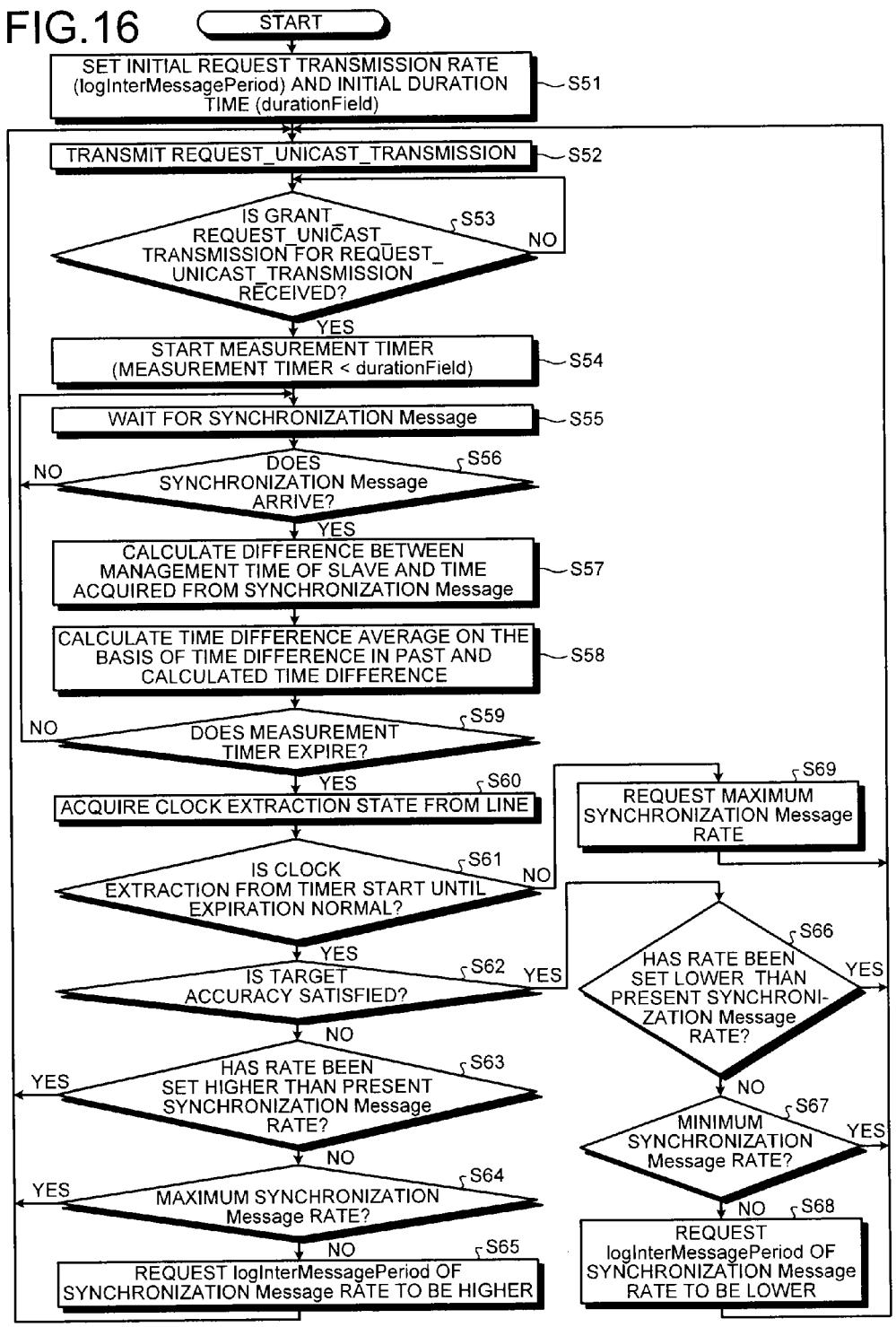
FIG. 16 is a flowchart illustrating a processing procedure for determining a validity period stored in logInterMessagePeriode of a Signaling message of a unicast transmission request transmitted from the communication apparatus (the slave).
Figure 17:
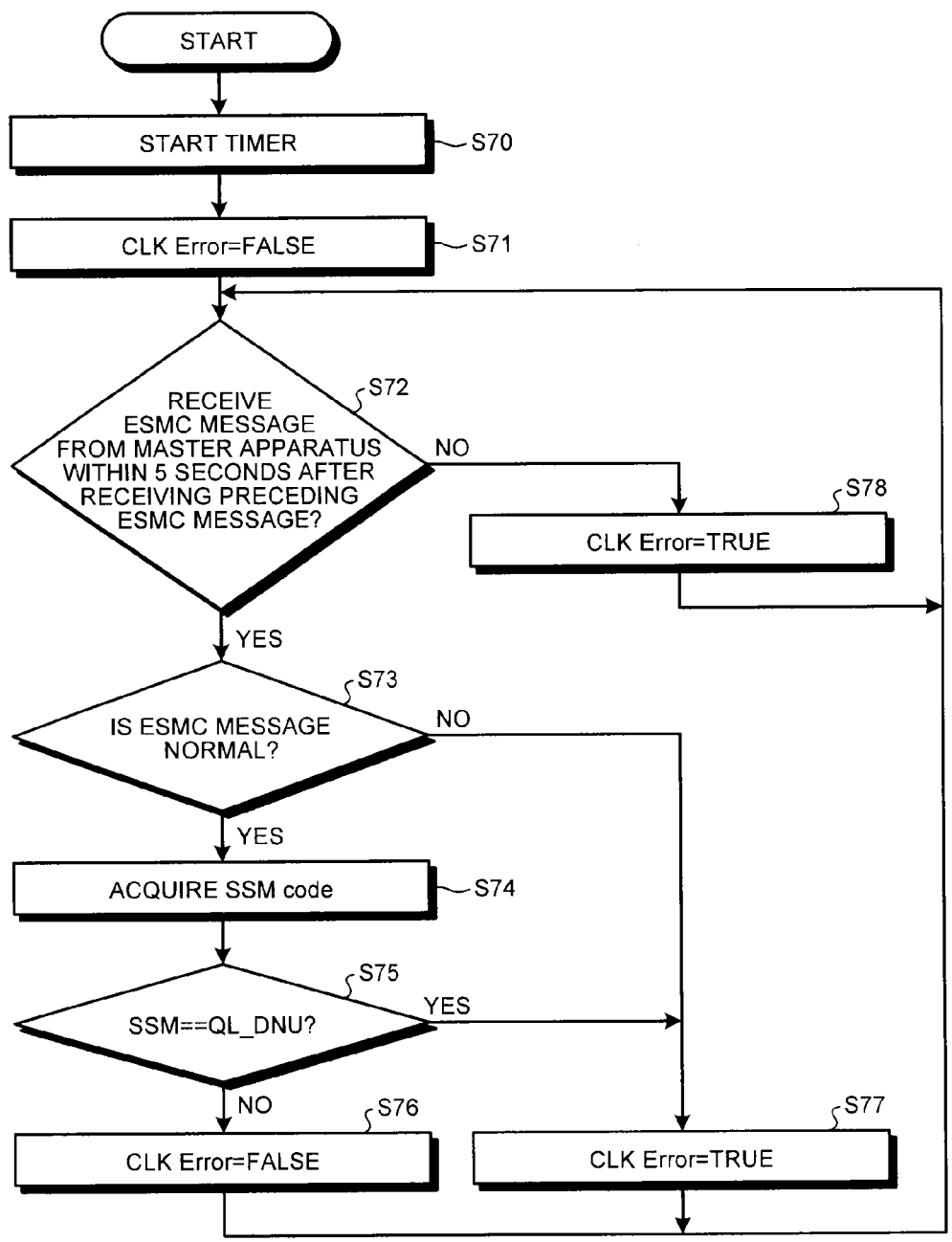
FIG. 17 is a diagram illustrating an example of a flowchart in which the communication apparatus (the slave) that receives the ESMC PDU determines clock quality through message notification.
Figure 18:
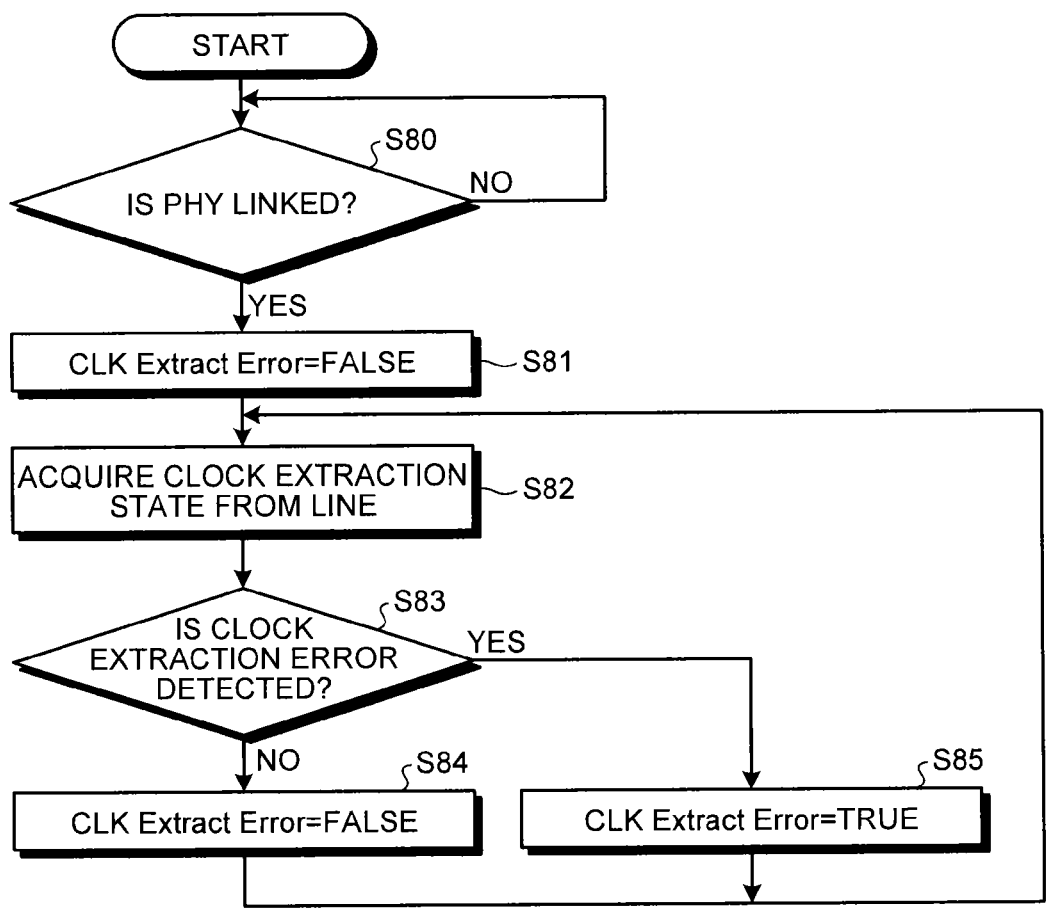
FIG. 18 is a diagram illustrating an example of a flowchart for determining clock quality on the basis of a condition where a clock is extracted from a clock received from the communication apparatus (the master) 100 via a line.

FIG. 16 is a flowchart illustrating a processing procedure for determining a validity period stored in the logInterMessagePeriode of a Signaling message of a unicast transmission request transmitted from the communication apparatus (the slave) 107. FIG. 17 is a diagram illustrating an example of a flowchart in which the communication apparatus (the slave) 107 that receives the ESMC PDU determines clock quality through message notification. FIG. 18 is a diagram illustrating an example of a flowchart in which the communication apparatus (the slave) 107 determines clock quality on the basis of a condition where a clock is extracted from a clock received from the communication apparatus (the master) 100 via a line.

A time synchronization control method associated with clock synchronization in the embodiment is described with reference to FIGS. 16, 17, and 18. Protocols for controlling clock synchronization and time synchronization are standards specified by ITU-T, IEEE, RFC, industrial and manufacturing associations, and the like. However, conformity to the respective standards depends on implementation. The embodiment is not limited according to which of the standards the embodiment conforms to. Protocols for controlling a time synchronization frame associated with clock synchronization are described below using terms specified With IEEE1588-2008 and ITU-T G.8264 and G.8265.1. However, a protocol for controlling clock synchronization and a protocol for controlling time synchronization are not limited to these protocols.

In the following description, a message notification mechanism and a synchronous transmission operation inside apparatuses are described separately for the communication apparatus (the master) 100 and the slave apparatus 107.

In clock synchronization frame transmission processing from the communication apparatus (the master) 100, first, the communication apparatus (the master) 100 performs notification of clock information (a lock state to clock sources and specification of the clock sources (the clock source 101 and the clock and time sources 103 and 105)) of a clock supplied to the communication apparatus (the slave) 107. As soon as the PHY 250 of the communication apparatus (the master) 100 confirms link establishment with the PHY 303 of the communication apparatus (the slave) 107 via the wired line 170, the CPU 204 generates the Information PDU (the ESMC PDU in which the Event flag is "b0") illustrated in FIG. 14. The CPU 204 transmits the generated Information PDU to the slave apparatus 107 via the wired line 170 through a route of the bridge 205→the queue 206→the PHY 250. As described above, if there is no change in the SSM code value, the communication apparatus (the master) 100 periodically notifies the communication apparatus (the slave) 107 of the Information PDU. For example, if the communication apparatus (the master) 100 is in an unlock state not synchronizing with (locked to) a clock source (the clock source is the clock 210 of the communication apparatus (the master) 100), the communication apparatus (the master) 100 notifies QL_DNU (4-bit width at "b1111", "bxxxx" X=0 or 1). If the communication apparatus (the master) 100 is locked to the clock source, the communication apparatus (the master) 100 notifies the clock sources of the values other than the QL_DNU corresponding. Further, when the SSM code value changes (lock to unlock, unlock to lock, lock to lock to another clock source, etc.), the communication apparatus (the master) 100 transmits the ESMC PDU (Event PDU), in which the Event flag is set to "b1", to the communication apparatus (the slave) 107 as soon as a change factor of the SSM code value is detected.

In clock synchronization frame reception processing of the communication apparatus (the slave) 107, first, the communication apparatus (the slave) 107 receives the ESMC PDU from the wired line 170 through a route of the PHY 303→the bridge 305→the queue 306→the CPU 304. The CPU 304 carries out processing for determining clock quality through the message notification illustrated in FIG. 17. As illustrated in FIG. 17, the CPU 304 starts a timer after the immediately preceding ESMC message is received (step S70) and initializes a variable CLK Error indicating presence or absence of a clock error to FALSE as an initial value (step S71). Subsequently, the CPU 304 determines whether the ESMC PDU (an ESMC message) is received from the communication apparatus (the master) 100 within five seconds after the previous ESMC message is received (step S72). If the ESMC message is received (Yes at step S72), the CPU 304 determines whether the received ESMC message is normal (step S73). On the other hand, when the ESMC message is not received (No at step S72), the CPU 304 changes the variable CLK Error to TRUE (step S78). The determination concerning whether the ESMC message is normal can be established according to, for example, whether a MAC (Media Access Control) DA (Destination Address) by ESMC message rules is identical with a value of its own apparatus ("01-90-C2-00-00-02" by an ITU-T G.8264 rule" and whether a Slow protocol Ethertype is a correct value ("88-09" by an ITU-T G.8264 rule).

When the ESMC message is normal (Yes at step S73), the CPU 304 acquires an SSM code from the message (step S74) and determines whether an SSM code value coincides with QL_DNU (step S75). When the SSM code value does not coincide with the QL_DNU (No at step S75), the CPU 304 changes the CLK Error to FALSE (i.e., a clock error is absent) (step S76) and returns to step S72. When the SSM code value coincides with the QL_DNU (Yes at step S75), the CPU 304 changes the CLK Error to TRUE (i.e., a clock error is present) (step S77) and returns to step S72.

If it is determined at step S73 that the ESMC message is not normal (No at step S73), the CPU 304 proceeds to step S77.

A clock synchronization operation of the communication apparatus (the master) 100 is described. An operation of the communication apparatus (the master) 100 illustrated in FIG. 1 for supplying a clock to the communication apparatus (the slave) 107 is described as an example. As described above, clocks are input to the MUX circuit 201 respectively from the clock 210, which is its own clock, and the clock source 101 and the clock and time sources 103 and 105, which are the external clock sources.

The MUX circuit 201 selects one clock source on the basis of clock extraction states of the input clocks, priority levels of the clock sources set by the CPU 204, and an SSM code value notified by an ESMC PDU from the clock and time source 105. As a specific selection method, for example, when all the clock sources are normal according to the clock extraction states and the SSM code value, the MUX circuit 201 selects a clock out of all the clock sources according to the priority levels. If it is determined that a part of the clock sources are abnormal according to the clock extraction states and the SSM code value, the MUX circuit 201 selects a clock out of the normal clock sources according to the priority levels. The selected clock is supplied to the PLL circuit 200. Note that it is assumed that the communication apparatus (the master) 100 receives the ESMC PDU from the clock and time source 105 through the line 105 and the CPU 204 extracts the SSM code value in the ESMC PDU received from the clock time source 105 through the bridge 205 and the queue 206 and notifies the MUX circuit 201 of the SSM code value. The PLL circuit 200 multiplies the clock to frequencies suitable for the devices and supplies the clock to the devices (a portion surrounded by an area 160) configuring the communication apparatus (the master) 100. The PHY 250 supplied with the clock multiplexes the clock with a signal transmitted to the communication apparatus (the slave) 107 via the wired line 170 and transmits the clock. Note that the MUX circuit 201 selects one clock source on the basis of the clock extraction states of the clocks, the priority levels of the clock sources set by the CPU 204, and the SSM code value notified from the clock and time source 105 by the ESMC PDU. However, the CPU 204 can select a clock on the basis of the clock extraction states of the clocks, the priority levels of the clock sources, and the SSM code value notified by the ESMC PDU from the clock and time source 105 and can notify the MUX circuit 201 of the selected clock by a selection command.

A clock synchronization operation of the communication apparatus (the slave) 107 is described. In the communication apparatus (the slave) 107, the PHY 303 extracts a clock from a reception signal received from the communication apparatus (the master) 100 via the wired line 170 and inputs the clock to the MUX circuit 301. The MUX circuit 301 selects any one of the clock input from the PHY 303 and the clock 310, which is an its own clock, and inputs the clock to the PLL circuit 300.

A selection method for a clock in the MUX circuit 301 is described below. The MUX circuit 301 determines, according to a flowchart illustrated in FIG. 18, presence or absence of a clock extraction error (clock quality) concerning a clock from the communication apparatus (the master) 100.

As illustrated in FIG. 18, first, the MUX circuit 301 determines whether the MUX circuit 301 is linked to a wired line by a PHY (step S80). If it is determined that the MUX circuit 301 is not linked (No at step S80), the MUX circuit 301 repeats the link determination processing. If it is determined that the MUX circuit 301 is linked (Yes at step S80), the MUX circuit 301 sets a variable CLK Extract Error indicating presence or absence of a clock extraction error to an initial value FALSE (step S81). The MUX circuit 301 acquires a clock extraction state of a clock input from the PHY 303 (step S82). Specifically, for example, the MUX circuit 301 calculates information indicating the quality of the clock such as stability of the clock by, for example, measuring the quality and determines whether the calculated quality satisfies assumed quality of the clock to thereby determine whether the clock extraction is correctly performed (a clock extraction error is absent).

The MUX circuit 301 determines on the basis of the acquired clock extraction state whether a clock extraction error is detected (step S83). When a clock extraction error is not detected (No at step S83), the MUX circuit 301 changes the CLK Extract Error to FALSE (i.e., a clock extraction error is absent) (step S84) and returns to step S82. When a clock extraction error is detected (Yes at step S83), the MUX circuit 301 changes the CLK Extract Error to TRUE (i.e., a clock extraction error is present) (step S85) and returns to step S82.

The MUX circuit 301 calculates OR operation of the CLK Extract Error calculated as described above and the CLK error based on the ESMC message described with reference to FIG. 17. If a result of the OR operation is FALSE, the MUX circuit 301 selects the clock supplied from the wired line 170 (the clock received from the communication apparatus (the master) 100). If the result is TRUE, the MUX circuit 301 selects the clock from the clock 310. Note that the MUX circuit 301 calculates the CLK Extract Error. However, the CPU 304 can calculate the CLK Extract Error. The CPU 304 can also calculate the OR operation of the CLK Extract Error and the CLK Error and notifies the MUX circuit 301 of a result of the OR operation. Further, the clock is selected using both of the CLK Extract Error and the CLK Error; however, the clock can be selected using any one of the CLK Extract Error and the CLK Error.

The MUX circuit 301 inputs the selected clock to the PLL circuit 300. The PHY 350 receives the supply of the clock from the PLL circuit 300. When a link with the terminal 108 is established via the wired line 180, the PHY 350 multiplies a transmission signal by the clock and supplies the clock to the terminal 108. In the communication apparatus (the slave) 107, as soon as the link with the terminal 108 is established, in the same manner as the transmission to the communication apparatus (the slave) 107 by the communication apparatus (the master) 100, the CPU 304 generates an ESMC message and transmits the ESMC message to the terminal 108 via the wired line 180 through a route of the bridge 305→the queue 306→the PHY 350.

Time synchronous frame processing between the communication apparatus (the master) 100 and the communication apparatus (the slave) 107 is carried out, for example, according to the procedure of the IEEE1588-2008 rule illustrated in FIG. 4. A PTP message is encapsulated by, for example, a format illustrated in FIG. 7 and exchanged between the communication apparatus (the master) 100 and the communication apparatus (the slave) 107. The configuration of the PTP message can be, for example, the configuration illustrated in FIG. 8. When permission of transmission of PTP messages conforms to ITU-T G.8265.1, as illustrated in FIGS. 5 and 6, the communication apparatus (the slave) 107 transmits unicast transmission requests respectively with respect to messages of Announce/Sync/Delay_Resp. The communication apparatus (the master) 100 returns responses (permission and non-permission) to the requests to the communication apparatus (the slave) 107.

Time synchronization frame processing performed when the communication apparatus (the slave) 107 first performs a time synchronization request is described. The communication apparatus (the master) 100 notifies, using PTP messages, the communication apparatus (the slave) 107 of time information (a lock state to a time source, specification of the selected time source 102 and the clock and time source 103, and time, etc.). As soon as a link with the communication apparatus (the master) 100 is established, the communication apparatus (the slave) 107 transmits a unicast transmission request Signaling message (REQUEST_UNICAST_TRANSMISSION TLV) as illustrated in FIG. 5. According to ITU-T G.8265.1, a message with which the communication apparatus (the slave) 107) requests unicast transmission first is an Announce message. Therefore, in a first Signaling message, the communication apparatus (the slave) 107 stores 0xB (=Announce) in a messageType (a message type). The communication apparatus (the slave) 107 stores, in a logInterMessagePeriod, as a requesting transmission rate of a message, x of a value (unit is second) indicated by the x-th power of the cardinal number 2 as a complementary number of 2 (e.g., if logInterMessagePeriod=0x00, the requesting transmission rate is the 0th power of 2 (=1 second)) and stores, in a durationField, as a requesting duration time of a message at the requesting transmission rate, y of a value (units are seconds) indicated by y as a complementary number of 2 (e.g., if durationField=0x001C, the requesting duration time of the requesting transmission rate is 30 seconds).

Thereafter, concerning a Sync message and a Delay_Resp message, similarly, a unicast transmission is requested by using the signaling message (REQUEST_UNICAST_TRANSMISSION TLV). On the contrary, when receiving a Signaling message (GRANT_UNICAST_TRANSMISSION TLV), which is a reply from the communication apparatus (the master) 100 illustrated in FIG. 5, the communication apparatus (the slave) 107 collates a messageType, a logInterMessagePeriod, and a durationField of the received message with the type, the requesting transmission rate, and the requesting duration time of the request message transmitted from its own apparatus so as to determine that the signaling message is a reply to the request from its own apparatus. The communication apparatus (the slave) 107 determines, with reference to a value of Renewal Invited, whether the request is admitted (if the value is "b1", determines whether the communication apparatus (the master) 100 admits the request and, if the value is "b0", determines that the communication apparatus (the master) 100 does not admit the request).

Time synchronous frame processing of the communication apparatus (the master) 100 is described. When receiving the Signaling message (REQUEST_UNICAST_TRANSMISSION TLV) from the communication apparatus (the slave) 107, the communication apparatus (the master) 100 collates the type, the requesting transmission rate, and the maximum duration time of the message of the unicast request with a maximum transmission rate and a maximum duration time set for the message time. If the requesting transmission rate and the requesting duration time of the request from the communication apparatus (the slave) 107 are respectively equal to or smaller than the maximum transmission rate and the maximum duration time, the communication apparatus (the master) 100 determines to admit the request. However, if any one of the requested amounts exceeds the maximum transmission rate or the maximum duration time, the communication apparatus (the master) 100 determines not to admit the request. The communication apparatus (the master) 100 returns the Signaling message (GRANT_UNICAST_TRANSMISSION TLV), in which a determination result is stored in the Renewal Invited, responding to the request transmitted from the slave apparatus 107 to the communication apparatus (the slave) 107. When the request is admitted, thereafter, during the requesting duration time, the communication apparatus (the master) 100 transmits the requested message to the communication apparatus (the slave) 107 at the requesting transmission rate.

A time synchronization operation of the communication apparatus (the master) 100 is described. In the communication apparatus (the master) 100, the PPS-signal receiving unit 231 receives a PPS signal from the time source 102 via the coaxial cable 120. The counter 221 receives time information indicated by the PPS signal through the serial-signal receiving unit 241 via the serial cable 121. The counter 221 captures, with the PPS signal as a trigger, the received time information and thereafter operates at a clock supplied by the PLL circuit 200 until the next capturing timing comes. The PPS-signal receiving unit 232 receives a PPS signal from the clock and time source 103 via the coaxial cable 130. The counter 222 receives time information indicated by the PPS signal through the serial-signal receiving unit 242 via the serial cable 131. The counter 222 captures, with the PPS signal as a trigger, the time information and thereafter operates at a clock supplied by the PLL circuit 200 until the next capturing timing comes.

From the clock and time source 105, the CPU 204 receives an Announce message, a Sync message, a Follow_Up message, a Delay_Resp message, and the like through a route of the PHY 203→the bridge 205→the queue 206→the CPU 204 via the wired line 150. The CPU 204 transmits a Delay_Req message to the clock and time source 105 via the wired line 150 through a route of the bridge 252→the queue 253→the PHY 203. The CPU 204 calculates time synchronizing with the clock and time source 105 on the basis of time information in the received message and reception time, sets a calculated result in the counter 220, and causes the counter 220 to operate at a clock supplied by the PLL circuit 200.

The MUX circuit 202 selects a counter (any one of the counters 220, 221, and 222) corresponding to the clock selected by the selection method described above and supplies a PPS signal from the selected counter to the PHYs 250 and 207. The CPU 204 sets time information corresponding to the selected counter in the PHYs 250 and 207. In this way, with the selected PPS signal as the trigger, it is possible to set the time information in the PHYs 250 and 207. Consequently, the communication apparatus (the master) 100 impresses a time stamp in the PHY 250 when transmitting the Announce message, the Sync message, the Follow_Up message, and the Delay_Resp message to the communication apparatus (the slave) 107; and impresses a time stamp in the PHY 250 when receiving a message from the communication apparatus (the slave) 107 to enable time synchronization between the communication apparatus (the master) 100 and the communication apparatus (the slave) 107.

A time synchronization operation of the communication apparatus (the slave) 107 is described. Given that the communication apparatus (the slave) 107 requests, with the unicast request described above, the communication apparatus (the master) 100 to transmit an Announce request, a Sync request, a Follow_Up request, and a Delay_Resp request and the transmission request is permitted. Specifically, the CPU 304 generates a Signaling message (REQUEST_UNICAST_TRANSMISSION TLV) and transmits the Signaling message to the communication apparatus (the master) 100 via the wired line 170 through a route of the bridge 352→the queue 353→the PHY 303. The CPU 304 receives a reply from the communication apparatus (the master) 100 through a route of the PHY 303→the bridge 305→the queue 306→the CPU 304 via the wired line 170. The CPU 304 receives the Announce message, the Sync message, the Follow_Up message, and the Delay_Resp message from the communication apparatus (the master) 100 through the same route. The CPU 304 calculates time on the basis of the Announce message, the Sync message, the Follow_Up message, and the Delay_Resp message and sets the calculated time in the counter 320.

The counter 320 transmits a PPS signal to the PHY 350. The CPU 304 notifies the PHY 350 of time information. The CPU 304 generates a Sync message and a Delay_Resp message and updates the time stamp in the PHY 350 when transmitting the Sync message and the Delay_Resp message to the terminal 108 through the CPU 304, the bridge 305, the queue 306, and the PHY 350. When receiving a Delay_Req message from the terminal 108 via the wired line 180, the CPU 304 impresses arrival time in the PHY 350 and notifies the PHY 350, the bridge 352, the queue 353, and the CPU 304 of the Delay_Req message. Consequently, the time synchronization is performable between the communication apparatus (the slave) 107 and the terminal 108.

A time synchronization control method corresponding to a clock supply state in the embodiment is described with reference to FIG. 16. As illustrated in FIG. 16, the communication apparatus (the sleeve) 107 starts, establishing the link with the communication apparatus (the master) 100 as a trigger, unicast transmission request processing of a time synchronization frame and sets a requesting transmission rate and a duration time of messages to an initial requesting transmission rate and an initial duration time decided in advance (step S51). The communication apparatus (the slave) 107 transmits a Signaling message (REQUEST_UNICAST_TRANSMISSION TLV), in which the value set at step S51 is stored, to the communication apparatus (the master) 100 (step S52).

Subsequently, the communication apparatus (the slave) 107 determines whether a Signaling message (GRANT_UNICAST_TRANSMISSION TLV), which is a response from the communication apparatus (the master) 100, is normally received (step S53). When the Signaling message (GRANT_UNICAST_TRANSMISSION TLV) is normally received (Yes at step S53), the communication apparatus (the slave) 107 starts a measuring timer (step S54). An expiration time of the measuring timer is set to a value smaller than a value of a durationField. The communication apparatus (the slave) 107 stands by for time synchronization messages (time synchronization messages such as a Sync message, a Follow_Up message, and a Delay_Resp message) (step S55) and determines whether a time synchronization message arrives (step S56). When the time synchronization message arrives (Yes at step S56), the CPU 304 calculates, on the basis of the time synchronization message, a time difference between time of the communication apparatus (the master) 100 and time of the CPU 304 (step S57) and calculates an average of time differences in a fixed period on the basis of the calculated time difference and time differences calculated in the past (step S58). The CPU 304 determines whether the measuring timer has expired (step S59). When the measuring timer has not expired (No at step S59), the CPU 304 returns to step S55.

When the measuring timer has expired (Yes at step S59), the clock errors within a time measured by the measuring timer is acquired (step S60). The clock errors are (1) the CLK Error according to the ESMC message described in the flowchart of FIG. 17 and (2) the clock extraction error (the CLK Extract Error) received from the communication apparatus (the master) 100 through the wired line 170 described in the flowchart of FIG. 18. The information of (1) and (2) is retained by the CPU 304 for a fixed period. The CPU 304 acquires the CLK Error and the CLK Extract Error within the time measured by the measuring timer.

The CPU 304 determines whether conditions are normal, on the basis of the CLK Error and the CLK Extract Error within the time measured by the measuring timer (step S61). When it is determined to be normal (Yes at step S61), the CPU 304 determines whether time synchronization accuracy (the average of the time differences to the communication apparatus (the master) 100 calculated at step S58) satisfies predetermined target accuracy (step S62). When the time synchronization accuracy does not satisfy the target accuracy (No at step S62), the CPU 304 determines whether a rate higher than a present requesting transmission rate of the time synchronization message has been requested (step S63). When a rate higher than the present requesting transmission rate of the time synchronization message has not been requested (No at step S63), the CPU 304 determines whether the present requesting transmission rate of the time synchronization message is a maximum (a maximum time synchronization message rate) (step S64). When the present requesting transmission rate of the time synchronization message is the maximum (Yes at step S64), the CPU 304 returns to step S52 without changing the requesting transmission rate. When the present requesting transmission rate of the time synchronization message is not the maximum (the maximum time synchronization rate) (No at step S64), the CPU 304 transmits a Signaling message (REQUEST_UNICAST_TRANSMISSION TLV), in which a requesting transmission rate (logInterMessagePeriode) is changed to a rate higher than a present value, to the communication apparatus (the master) 100 to thereby request a higher requesting transmission rate (step S65) and returns to step S52.

If it is determined at step S63 that a rate higher than the present requesting transmission rate of the time synchronization message has been requested (Yes at step S63), the CPU 304 returns to step S52 without changing the requesting transmission rate.

If it is determined at step S61 that the extraction from the clock errors is not normal (No at step S61), the CPU 304 transmits a Signaling message (REQUEST_UNICAST_TRANSMISSION TLV), in which the requesting transmission rate (logInterMessagePeriode) is changed to a maximum, to the communication apparatus (the master) 100 to request a maximum time synchronization message rate (step S69) and returns to step S52.

When the time synchronization accuracy satisfies the target accuracy at step S62 (Yes at step S62), the CPU 304 determines whether a rate lower than the present requesting transmission rate of the time synchronization message has been requested (step S66). When a rate lower than the present requesting transmission rate of the time synchronization message has not been requested (No at step S66), the CPU 304 determines whether the present requesting transmission rate of the time synchronization message is a minimum (a minimum time synchronization message rate) (step S67). When the present requesting transmission rate of the time synchronization message is not the minimum (the minimum time synchronization message rate) (No at step S67), the CPU 304 transmits a Signaling message (REQUEST_UNICAST_TRANSMISSION TLV), in which the request transmission rate (logInterMessagePeriode) is changed to a rate lower than a present value, to the communication apparatus (the master) 100 to thereby request a lower requesting transmission rate (step S68) and returns to step S52.

If it is determined at step S66 that a rate lower than the present requesting transmission rate of the time synchronization message has been requested (Yes at step S66), the CPU 304 returns to step S52 without changing the requesting transmission rate. If it is determined at step S67 that the present requesting transmission rate of the time synchronization message is the minimum (Yes at step S67), the CPU 304 returns to step S52 without changing the requesting transmission rate. As described above, by changing the requesting transmission rate of the time synchronization message according to a condition of clock synchronization, it is possible to realize optimization of a processing load, a band, and power consumption of the communication apparatus (the slave) 107. If it is determined at step S56 that the time synchronization message does not arrive (No at step S56), the CPU 304 returns to step S55.

Note that the clock and time synchronization between the communication apparatus (the master) 100 and the communication apparatus (the slave) 107 is described above. However, concerning clock and time synchronization between the communication apparatus (the master) 100 and the communication apparatus (the slave) 109, a requesting transmission rate of a time synchronization message can also be changed according to a condition of clock synchronization. Further, concerning clock and time synchronization between the communication apparatus (the slave) 107 and the terminal 108, a requesting transmission rate of a time synchronization message can also be changed according to a condition of clock synchronization.

Note that, in the above description, the procedure in performing both of the clock synchronization and the time synchronization is described. However, when only the time synchronization is performed, a requesting transmission rate of a time synchronization message can be changed as described above. In this case, the processing concerning the CLK Extract Error and the CLK Error does not have to be carried out.

As a function realized by the CPU 204, the communication apparatus (the master) 100 can include a time-information-supply managing unit that manages resources for supplying time information and controls a supply rule of the time information (a resource amount (a maximum transmission rate of a time synchronization frame, etc.) used for time synchronization, etc.). The supply rule of the time information can be set changeable by an operator or the like after operation. Besides the CPU 204, an internal logic of the communication apparatus (the master) 100 can be separately realized.

As described above, in the embodiment, the requesting transmission rate of the time synchronization message is changed according to a condition of the clock synchronization. Therefore, it is possible to realize optimization of a processing load, a band, and power consumption of the communication apparatus (the slave) 107 and reduce transmission and reception loads of the communication apparatus (the slave) 107.

INDUSTRIAL APPLICABILITY

As described above, the communication apparatus, the communication system, and the time synchronization method according to the present invention are useful for a communication system that performs clock and time synchronization and, in particular, suitable for a communication system that perform time synchronization using a time synchronization message.

REFERENCE SIGNS LIST

100 Communication apparatus (master)
101 Clock source
102 Time source
103, 105 Clock and time source
104 GPS receiver
106 GPS satellite
107, 109 Communication apparatus (slave)
108 Terminal
112, 120, 130, 140, 141 Coaxial cable
121, 131 Serial cable
150, 170, 190 Wired line
151 Network
200, 300 PLL circuits (PLL)
201, 202, 251 MUX circuits (MUX)
203, 250, 207, 303, 350 PHY
204, 304 CPU
205, 252, 305, 352 Bridge
206, 253, 306, 353 Queue
210, 310 Clock
211, 212 Level converting unit
220, 221, 222, 320 Counter
231, 232 PPS-signal receiving unit
241, 242 Serial-signal receiving unit

The invention claimed is:
1. A communication apparatus operating as a slave apparatus that performs time synchronization with a master apparatus on the basis of a time synchronization message transmitted from the master apparatus at a fixed cycle, the communication apparatus comprising
a control unit that stores, in a transmission request message for requesting transmission of the time synchronization message, a requesting transmission rate, which is a requesting value of a transmission rate of the time synchronization message, and transmits the transmission request message to the master apparatus,
a clock extracting unit that extracts a clock transmitted from the master apparatus; and
a clock generating unit that generates an its own clock, which is a clock generated by its own apparatus,
wherein
the control unit
calculates time synchronization accuracy, which is a difference between time of the master apparatus and time of its own apparatus, on the basis of the time synchronization message,
determines, on the basis of the time synchronization accuracy, whether the requesting transmission rate is changed, and,
transmits, if it is determined that the requesting transmission rate is changed, the transmission request message, in which the changed requesting transmission rate is stored, to the master apparatus, and
the control unit selects any one of the clock extracted by the clock extracting unit and its own clock on the basis of clock synchronization information that is notified from the master apparatus and that includes
information indicating a reference clock source being used in the master apparatus and
information indicating whether the master apparatus synchronizes with the reference clock source.

2. The communication apparatus according to claim 1, wherein
the control unit
calculates a clock extraction state indicating quality of the clock extracted by the clock extracting unit and
selects, on the basis of the clock extraction state, any one of the clock extracted by the clock extracting unit and its own clock.

3. The communication apparatus according to claim 1, wherein
the control unit calculates, as the time synchronization accuracy, a difference between time information in the master apparatus supplied by the time synchronization message from the master apparatus and time information managed by its own apparatus.

4. The communication apparatus according to claim 1, wherein
the control unit
changes, when the time synchronization accuracy is within predetermined target time synchronization accuracy, the requesting transmission rate in order to reduce the requesting transmission rate and
changes, when the time synchronization accuracy exceeds the target time synchronization accuracy, the requesting transmission rate to increase the requesting transmission rate.

5. A communication apparatus operating as a master apparatus of time synchronization that transmits a time synchronization message to a slave apparatus at a fixed cycle, the communication apparatus comprising
a control unit that, when receiving, from the slave apparatus, a transmission request message for requesting transmission of the time synchronization message in which a requesting transmission rate, which is requesting value of a transmission rate of the time synchronization message, is stored,
transmits, if it is determined that transmission at the requesting transmission rate is possible, a response message for permitting a request to the slave apparatus,
transmits, if it is determined that the transmission at the requesting transmission rate is difficult, a response message for not permitting a request to the slave apparatus,
transmits a clock to the slave apparatus, and
transmits, to the slave apparatus, clock synchronization information that includes
information indicating a reference clock source that its own apparatus uses and
information indicating whether synchronized with the reference clock source, wherein
the clock synchronization information is used, in the slave apparatus, for selecting any one of the clock that is received and a clock that is generated in the slave apparatus.

6. The communication apparatus according to claim 5, the communication apparatus being connected to a plurality of reference clock sources, wherein
the control unit
monitors a supply state of a clock for each of the reference clock sources,
selects one of the reference clock sources on the basis of a priority level decided in advance for each of the reference clock sources and the supply state,
causes its own apparatus to operate on the basis of a clock by the selected reference clock source, and
transmits the selected clock to the slave apparatus.

7. The communication apparatus according to claim 5, further comprising
a time-information-supply managing unit that
manages a resource for supplying time information and
notifies the control unit of an upper limit value of the transmission rate of the time synchronization message.

8. A communication system comprising:
a master apparatus; and
a slave apparatus, wherein
the slave apparatus performs time synchronization with the master apparatus on the basis of a time synchronization message transmitted from the master apparatus at a fixed cycle,
the slave apparatus includes
a control unit that
stores, in a transmission request message for requesting transmission of the time synchronization message, a requesting transmission rate, which is a requesting value of a transmission rate of the time synchronization message,
transmits the transmission request message to the master apparatus,
a clock extracting unit that extracts a clock transmitted from the master apparatus, and
a clock generating unit that generates an its own clock, which is a clock generated by its own apparatus,
the control unit
calculates time synchronization accuracy, which is a difference between time of the master apparatus and time of its own apparatus, on the basis of the time synchronization message, determines on the basis of the time synchronization accuracy whether the requesting transmission rate is changed, and, transmits, if it is determined that the requesting transmission rate is changed, the transmission request message, in which the changed requesting transmission rate is stored, to the master apparatus, and the master apparatus, when receiving the transmission request message from the slave apparatus, transmits, if it is determined that transmission at the requesting transmission rate in the transmission request message is possible, a response message for permitting a request to the slave apparatus and, transmits, if it is determined that the transmission at the requesting transmission rate is difficult, a response message for not permitting a request to the slave apparatus, transmits, to the slave apparatus, clock synchronization information that includes information indicating a reference clock source that its own apparatus uses and information indicating whether synchronized with the reference clock source, the slave apparatus selects any one of a clock that has been extracted by the clock extracting unit and its own clock on the basis of the clock synchronization information.

9. A time synchronization method in a communication system including a master apparatus and a slave apparatus, the time synchronization method comprising:

a time synchronization step in which the slave apparatus performs time synchronization with the master apparatus on the basis of a time synchronization message transmitted from the master apparatus at a fixed cycle;

a transmission request step in which the slave apparatus stores, in a transmission request message for requesting transmission of the time synchronization message, a requesting transmission rate, which is a requesting value of a transmission rate of the time synchronization message, and transmits the transmission request message to the master apparatus;

a rate changing step in which the slave apparatus calculates time synchronization accuracy, which is a difference between time of the master apparatus and time of its own apparatus, on the basis of the time synchronization message, determines on the basis of the time synchronization accuracy whether the requesting transmission rate is changed, and, transmits, if it is determined that the requesting transmission rate is changed, the transmission request message, in which the changed requesting transmission rate is stored, to the master apparatus;

a permission determining step in which the master apparatus, when receiving the transmission request message from the slave apparatus, transmits, if it is determined that transmission at the requesting transmission rate in the transmission request message is possible, a response message for permitting a request to the slave apparatus and, transmits, if it is determined that the transmission at the requesting transmission rate is difficult, a response message for not permitting a request to the slave apparatus, a clock extraction step in which the slave apparatus extracts a clock transmitted from the master apparatus;

a clock generation step in which the slave apparatus generates an its own clock, which is a clock generated by the slave apparatus;

a synchronization information transmission step in which the master apparatus transmits, to the slave apparatus, clock synchronization information that includes information indicating a reference clock source that the master apparatus uses and information indicating whether synchronized with the reference clock source; and a selection step in which the slave apparatus selects any one of a clock that has been extracted at the clock extraction step and its own clock on the basis of the clock synchronization information that is received.

* * * * *